US012273789B2

(12) United States Patent
Gummadi et al.

(10) Patent No.: US 12,273,789 B2
(45) Date of Patent: Apr. 8, 2025

(54) MEASUREMENT OF SOUNDING REFERENCE SIGNAL VIA UPLINK RELAY

(71) Applicant: QUALCOMM Incorporated, San Diego, CA (US)

(72) Inventors: Bapineedu Chowdary Gummadi, Hyderabad (IN); Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 358 days.

(21) Appl. No.: 17/808,048

(22) Filed: Jun. 21, 2022

(65) Prior Publication Data

US 2023/0413012 A1    Dec. 21, 2023

(51) Int. Cl.
*H04W 24/00* (2009.01)
*G01S 5/00* (2006.01)
*H04L 5/00* (2006.01)
*H04W 4/029* (2018.01)
*H04W 64/00* (2009.01)

(52) U.S. Cl.
CPC .......... *H04W 4/029* (2018.02); *G01S 5/0036* (2013.01); *H04L 5/0051* (2013.01); *H04W 64/00* (2013.01)

(58) Field of Classification Search
CPC ..... H04W 4/029; H04W 64/00; G01S 5/0036; G01S 5/0205; G01S 5/0081; H04L 5/0051
See application file for complete search history.

(56) References Cited

U.S. PATENT DOCUMENTS

| 4,740,792 A * | 4/1988 | Sagey ..................... G01S 19/38 342/50 |
| 6,154,657 A * | 11/2000 | Grubeck ............... H04W 64/00 455/456.2 |
| 9,426,707 B1 * | 8/2016 | Sitaram ............. H04W 36/0058 |
| 10,075,217 B1 * | 9/2018 | Sung .................. H04B 7/15507 |
| 2007/0202803 A1 * | 8/2007 | Miyoshi ............... H04L 5/0094 455/11.1 |
| 2008/0049678 A1 * | 2/2008 | Chindapol ........... H04B 7/2606 370/331 |

(Continued)

FOREIGN PATENT DOCUMENTS

| WO | 2011035673 A1 | 3/2011 |
| WO | 2020190607 A3 | 9/2020 |
| WO | 2020222194 A1 | 11/2020 |

OTHER PUBLICATIONS

International Search Report and Written Opinion—PCT/US2023/021308—ISA/EPO—Aug. 30, 2023.

*Primary Examiner* — Stephen M D Agosta
(74) *Attorney, Agent, or Firm* — Muncy, Geissler, Olds & Lowe, P.C./Qualcomm

(57) ABSTRACT

Disclosed are techniques for wireless position estimation of a user equipment (UE) involving one or more uplink (UL) relays. The UL relay(s) receives UL data communications from UEs, and relay the UL data communications to a serving network component (e.g., gNB) via a backhaul connection (wired or wireless). In an aspect, uplink relay(s) are selected by a network component for a position estimation session of a target UE. The uplink relay(s) measure UL SRS for positioning from the target UE, and report UL SRS measurement information to the network component and/or the serving network component.

25 Claims, 16 Drawing Sheets

(56) References Cited

U.S. PATENT DOCUMENTS

| | | | | |
|---|---|---|---|---|
| 2008/0107073 | A1* | 5/2008 | Hart | H04L 27/2602 370/330 |
| 2009/0073915 | A1* | 3/2009 | Zhang | H04B 7/2606 370/315 |
| 2009/0117901 | A1* | 5/2009 | Zhao | H04W 36/08 455/436 |
| 2010/0093358 | A1* | 4/2010 | Cheong | H04W 36/0055 455/444 |
| 2010/0323720 | A1* | 12/2010 | Jen | H04W 64/00 455/456.1 |
| 2011/0243037 | A1* | 10/2011 | Sundstrom | H04B 7/15542 370/279 |
| 2012/0040694 | A1* | 2/2012 | Zhou | G01S 5/06 455/456.1 |
| 2012/0057523 | A1* | 3/2012 | Ji | H04L 5/0032 370/315 |
| 2012/0093040 | A1* | 4/2012 | Wu | H04W 88/04 370/279 |
| 2012/0230231 | A1* | 9/2012 | Lim | H04L 5/1469 370/280 |
| 2012/0257532 | A1* | 10/2012 | Nakada | H04B 7/2606 370/252 |
| 2013/0163440 | A1* | 6/2013 | Issakov | G01S 5/06 370/246 |
| 2013/0286901 | A1* | 10/2013 | Yuan | H04L 1/1861 370/279 |
| 2015/0163021 | A1* | 6/2015 | Braithwaite | H04W 72/21 370/315 |
| 2016/0183162 | A1* | 6/2016 | Jeong | H04W 12/50 370/315 |
| 2016/0227373 | A1* | 8/2016 | Tsai | G01S 5/0072 |
| 2016/0337805 | A1* | 11/2016 | Liao | H04W 8/005 |
| 2017/0223506 | A1* | 8/2017 | Kim | H04W 64/00 |
| 2018/0206207 | A1* | 7/2018 | Yu | H04W 8/08 |
| 2018/0284291 | A1* | 10/2018 | Marmet | G01S 19/46 |
| 2019/0372820 | A1* | 12/2019 | Tao | H04B 7/15528 |
| 2019/0373538 | A1* | 12/2019 | Tao | H04W 12/0431 |
| 2020/0169956 | A1* | 5/2020 | Sun | H04W 84/04 |
| 2020/0296680 | A1* | 9/2020 | Akkarakaran | H04W 4/029 |
| 2021/0105066 | A1* | 4/2021 | Uchiyama | H04W 76/14 |
| 2021/0314800 | A1 | 10/2021 | Manolakos et al. | |
| 2022/0123886 | A1* | 4/2022 | Munier | H04W 52/325 |
| 2022/0236404 | A1* | 7/2022 | Gunnarsson | G01S 13/878 |
| 2022/0361027 | A1* | 11/2022 | Siomina | H04W 24/08 |
| 2023/0345380 | A1* | 10/2023 | Lee | H04W 64/00 |
| 2023/0362877 | A1* | 11/2023 | Iwabuchi | H04W 64/00 |
| 2023/0422202 | A1* | 12/2023 | Manolakos | H04W 64/00 |
| 2024/0031975 | A1* | 1/2024 | Baek | H04W 4/40 |
| 2024/0147557 | A1* | 5/2024 | Balakrishnan | H04B 7/15 |
| 2024/0244678 | A1* | 7/2024 | Li | H04W 40/24 |
| 2024/0323910 | A1* | 9/2024 | Pan | H04L 5/0094 |
| 2025/0008468 | A1* | 1/2025 | Manolakos | H04W 64/00 |

* cited by examiner

MEASUREMENT OF SOUNDING REFERENCE SIGNAL VIA UPLINK RELAY

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a network component includes determining a coarse position estimate associated with a target user equipment (UE); determining location information associated with a set of uplink relays; and selecting a group of wireless nodes for a position estimation session of the target UE based on the coarse position estimate and the location information associated with the set of uplink relays, the group of wireless nodes comprising at least one uplink relay that is configured to relay uplink wireless data communications from UEs to one or more serving network components configured to transmit downlink wireless data communications to the one or more UEs; transmitting, to the at least one uplink relay, at least one request to measure an uplink sounding reference signal (SRS) for positioning from the target UE in association with the position estimation session; receiving at least one report comprising measurement information associated with the uplink SRS for positioning from the target UE as measured by the at least one uplink relay; and determining a position estimate of the target UE based on the at least one report.

In an aspect, a method of operating an uplink relay includes receiving one or more uplink wireless data communications from one or more user equipments (UEs); relaying, via a backhaul connection, the one or more uplink data communications to one or more serving network components configured to transmit downlink wireless data communications to the one or more UEs; receiving, from a network component, a request to measure an uplink sounding reference signal (SRS) for positioning from a target UE; measuring the uplink SRS for positioning from the target UE in accordance with the request; and transmitting, to the network component, a report comprising measurement information associated with the measured uplink SRS for positioning.

In an aspect, a network component includes a memory; at least one transceiver; and at least one processor communicatively coupled to the memory and the at least one transceiver, the at least one processor configured to: determine a coarse position estimate associated with a target user equipment (UE); determine location information associated with a set of uplink relays; and select a group of wireless nodes for a position estimation session of the target UE based on the coarse position estimate and the location information associated with the set of uplink relays, the group of wireless nodes comprising at least one uplink relay that is configured to relay uplink wireless data communications from UEs to one or more serving network components configured to transmit downlink wireless data communications to the one or more UEs; transmit, via the at least one transceiver, to the at least one uplink relay, at least one request to measure an uplink sounding reference signal (SRS) for positioning from the target UE in association with the position estimation session; receive, via the at least one transceiver, at least one report comprising measurement information associated with the uplink SRS for positioning from the target UE as measured by the at least one uplink relay; and determine a position estimate of the target UE based on the at least one report.

In an aspect, an uplink relay includes a memory; at least one transceiver; and at least one processor communicatively coupled to the memory and the at least one transceiver, the at least one processor configured to: receive, via the at least one transceiver, one or more uplink wireless data communications from one or more user equipments (UEs); relay, via a backhaul connection, the one or more uplink data communications to one or more serving network components configured to transmit downlink wireless data communications to the one or more UEs; receive, via the at least one transceiver, from a network component, a request to measure an uplink sounding reference signal (SRS) for positioning from a target UE; measure the uplink SRS for positioning from the target UE in accordance with the request; and transmit, via the at least one transceiver, to the network component, a report comprising measurement information associated with the measured uplink SRS for positioning.

In an aspect, an uplink relay includes means for determining a coarse position estimate associated with a target user equipment (UE); means for determining location information associated with a set of uplink relays; and means for selecting a group of wireless nodes for a position estimation session of the target UE based on the coarse position estimate and the location information associated with the set of uplink relays, the group of wireless nodes comprising at least one uplink relay that is configured to relay uplink wireless data communications from UEs to one or more serving network components configured to transmit downlink wireless data communications to the one or more UEs; means for transmitting, to the at least one uplink relay, at least one request to measure an uplink sounding reference signal (SRS) for positioning from the target UE in association with the position estimation session; means for receiving at least one report comprising measurement information associated with the uplink SRS for positioning from the target UE as measured by the at least one uplink relay; and means for determining a position estimate of the target UE based on the at least one report.

In an aspect, a network component includes means for receiving one or more uplink wireless data communications from one or more user equipments (UEs); means for relaying, via a backhaul connection, the one or more uplink data communications to one or more serving network components configured to transmit downlink wireless data communications to the one or more UEs; means for receiving, from a network component, a request to measure an uplink sounding reference signal (SRS) for positioning from a target UE; means for measuring the uplink SRS for positioning from the target UE in accordance with the request; and means for transmitting, to the network component, a report comprising measurement information associated with the measured uplink SRS for positioning.

In an aspect, a non-transitory computer-readable medium storing computer-executable instructions that, when executed by a network component, cause the network component to: determine a coarse position estimate associated with a target user equipment (UE); determine location information associated with a set of uplink relays; and select a group of wireless nodes for a position estimation session of the target UE based on the coarse position estimate and the location information associated with the set of uplink relays, the group of wireless nodes comprising at least one uplink relay that is configured to relay uplink wireless data communications from UEs to one or more serving network components configured to transmit downlink wireless data communications to the one or more UEs; transmit, to the at least one uplink relay, at least one request to measure an uplink sounding reference signal (SRS) for positioning from the target UE in association with the position estimation session; receive at least one report comprising measurement information associated with the uplink SRS for positioning from the target UE as measured by the at least one uplink relay; and determine a position estimate of the target UE based on the at least one report.

In an aspect, a non-transitory computer-readable medium storing computer-executable instructions that, when executed by an uplink relay, cause the uplink relay to: receive one or more uplink wireless data communications from one or more user equipments (UEs); relay, via a backhaul connection, the one or more uplink data communications to one or more serving network components configured to transmit downlink wireless data communications to the one or more UEs; receive, from a network component, a request to measure an uplink sounding reference signal (SRS) for positioning from a target UE; measure the uplink SRS for positioning from the target UE in accordance with the request; and transmit, to the network component, a report comprising measurement information associated with the measured uplink SRS for positioning.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
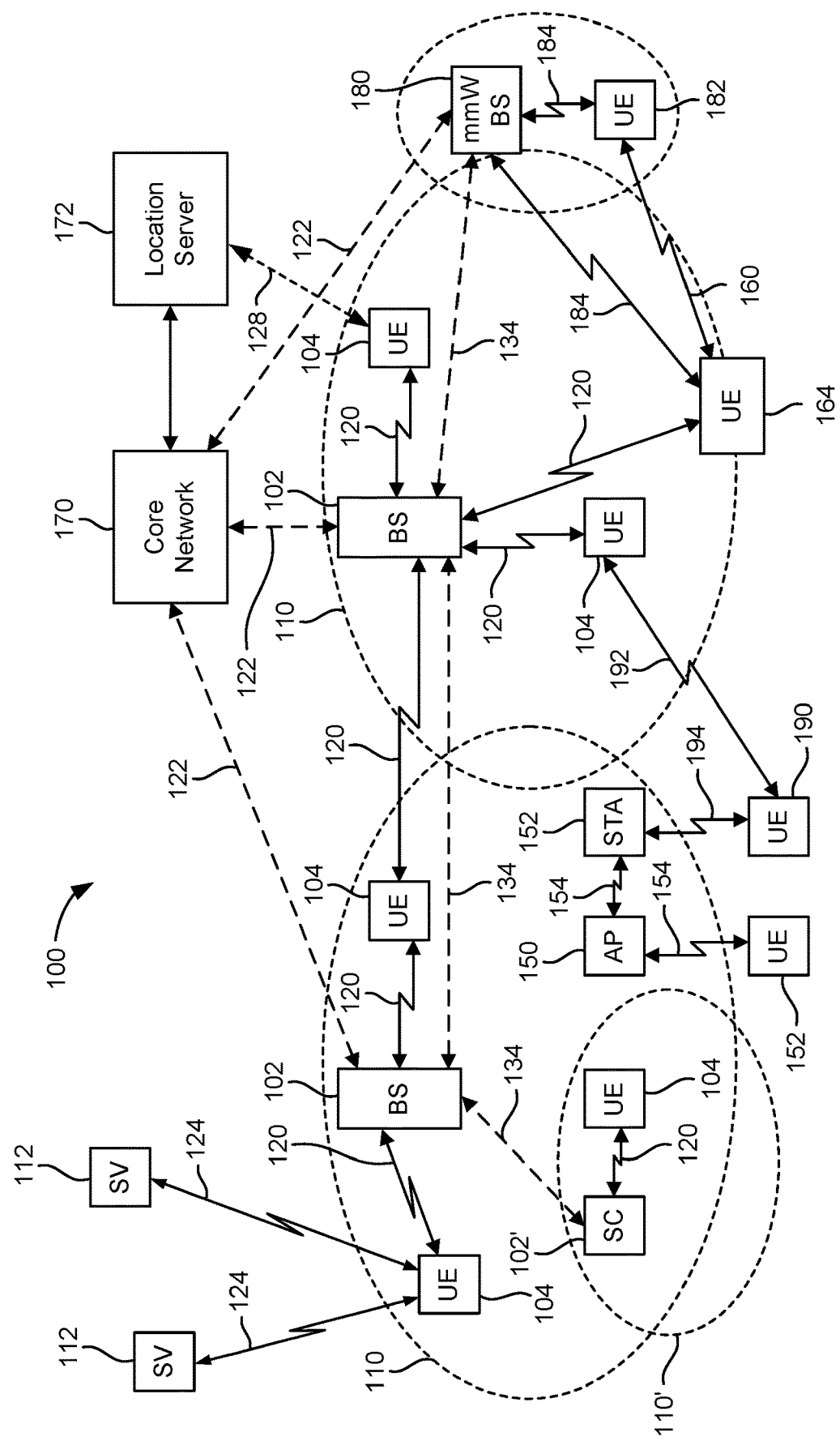
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof.

Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions.

A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
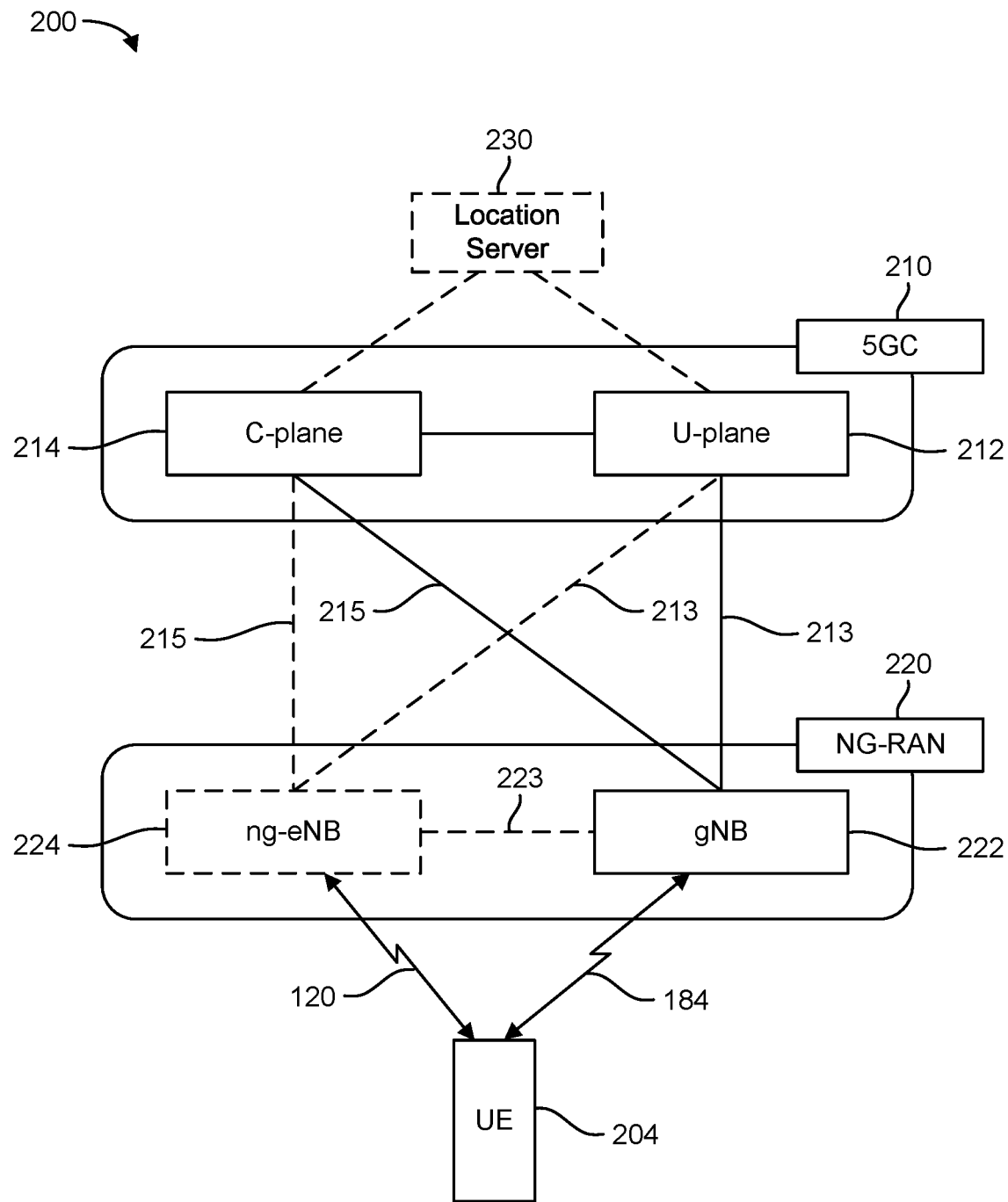
FIGS. 2A, 2B, and 2C illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
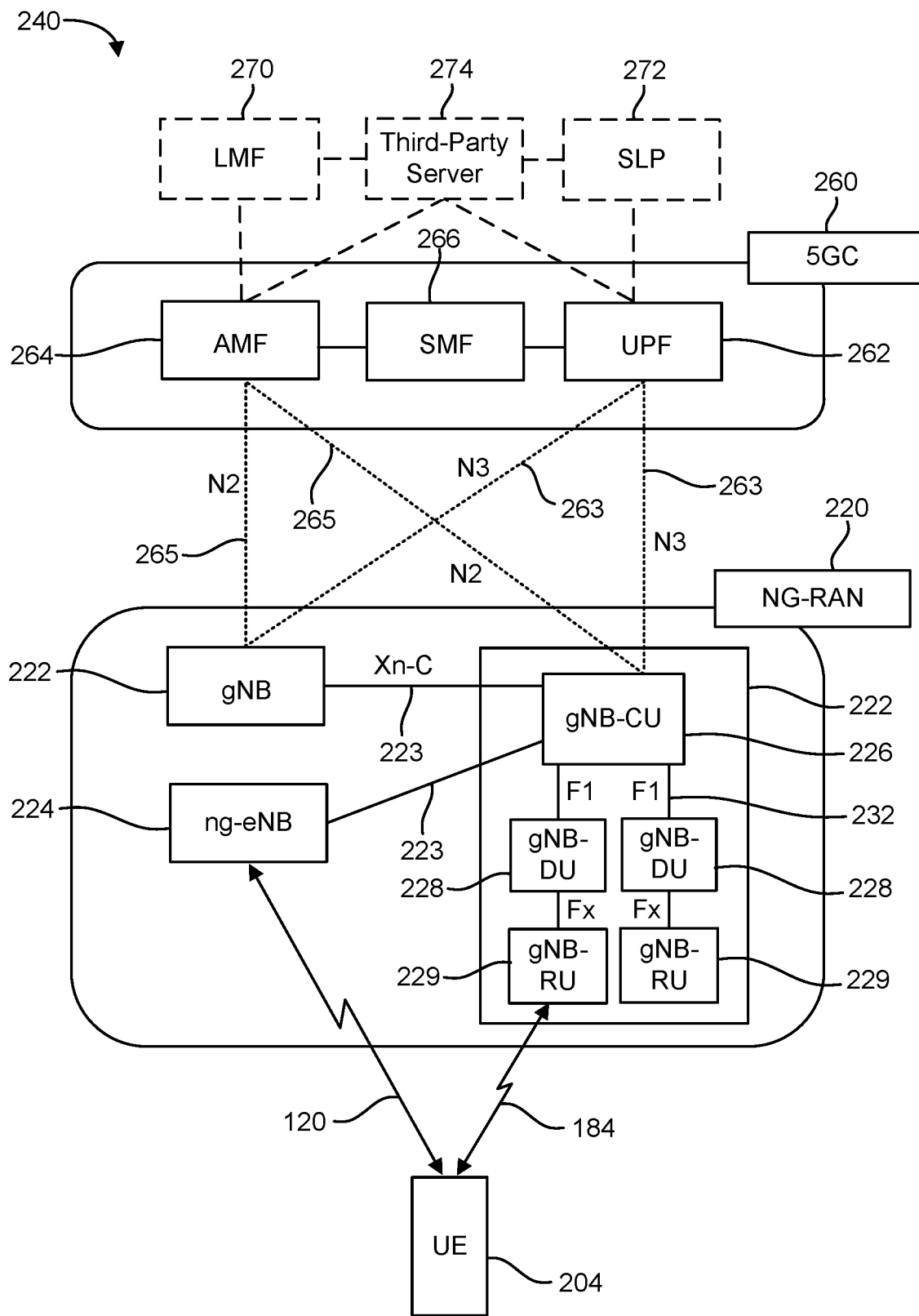

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station, or one or more units (or one or more components) performing base station functionality, may be implemented in an aggregated or disaggregated architecture. For example, a base station (such as a Node B (NB), evolved NB (eNB), NR base station, 5G NB, access point (AP), a transmit receive point (TRP), or a cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2C:
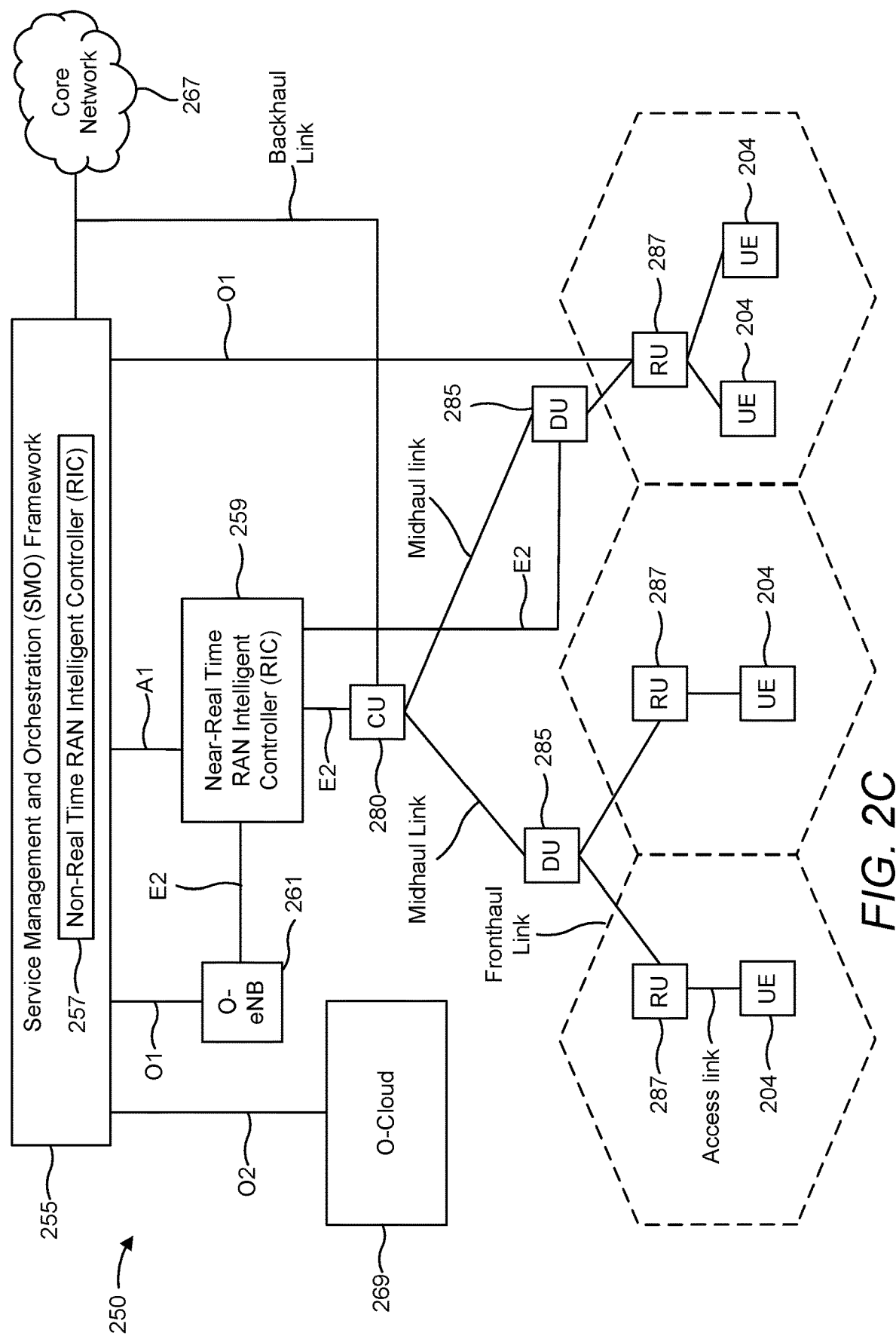

FIG. 2C illustrates an example disaggregated base station architecture 250, according to aspects of the disclosure. The disaggregated base station architecture 250 may include one or more central units (CUs) 280 (e.g., gNB-CU 226) that can communicate directly with a core network 267 (e.g., 5GC 210, 5GC 260) via a backhaul link, or indirectly with the core network 267 through one or more disaggregated base station units (such as a Near-Real Time (Near-RT) RAN Intelligent Controller (RIC) 259 via an E2 link, or a Non-Real Time (Non-RT) RIC 257 associated with a Service Management and Orchestration (SMO) Framework 255, or both). A CU 280 may communicate with one or more distributed units (DUs) 285 (e.g., gNB-DUs 228) via respective midhaul links, such as an F1 interface. The DUs 285 may communicate with one or more radio units (RUs) 287 (e.g., gNB-RUs 229) via respective fronthaul links. The RUs 287 may communicate with respective UEs 204 via one or more radio frequency (RF) access links. In some implementations, the UE 204 may be simultaneously served by multiple RUs 287.

Each of the units, i.e., the CUs 280, the DUs 285, the RUs 287, as well as the Near-RT RICs 259, the Non-RT RICs 257 and the SMO Framework 255, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 280 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 280. The CU 280 may be configured to handle user plane functionality (i.e., Central Unit—User Plane (CU-UP)), control plane functionality (i.e., Central Unit—Control Plane (CU-CP)), or a combination thereof. In some implementations, the CU 280 can be logically split into one or more CU-UP units and one or more CU-CP units. The CU-UP unit can communicate bidirectionally with the CU-CP unit via an interface, such as the E1 interface when implemented in an O-RAN configuration. The CU 280 can be implemented to communicate with the DU 285, as necessary, for network control and signaling.

The DU 285 may correspond to a logical unit that includes one or more base station functions to control the operation of one or more RUs 287. In some aspects, the DU 285 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 285 may further host one or more low PHY layers. Each layer (or module) can be implemented with an interface configured to communicate signals with other layers (and modules) hosted by the DU 285, or with the control functions hosted by the CU 280.

Lower-layer functionality can be implemented by one or more RUs 287. In some deployments, an RU 287, controlled by a DU 285, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 287 can be implemented to handle over the air (OTA) communication with one or more UEs 204. In some implementations, real-time and non-real-time aspects of control and user plane communication with the RU(s) 287 can be controlled by the corresponding DU 285. In some scenarios, this configuration can enable the DU(s) 285 and the CU 280 to be implemented in a cloud-based RAN architecture, such as a vRAN architecture.

The SMO Framework 255 may be configured to support RAN deployment and provisioning of non-virtualized and virtualized network elements. For non-virtualized network elements, the SMO Framework 255 may be configured to support the deployment of dedicated physical resources for RAN coverage requirements which may be managed via an operations and maintenance interface (such as an O1 interface). For virtualized network elements, the SMO Framework 255 may be configured to interact with a cloud computing platform (such as an open cloud (O-Cloud) 269) to perform network element life cycle management (such as to instantiate virtualized network elements) via a cloud computing platform interface (such as an O2 interface). Such virtualized network elements can include, but are not limited to, CUs 280, DUs 285, RUs 287 and Near-RT RICs 259. In some implementations, the SMO Framework 255 can communicate with a hardware aspect of a 4G RAN, such as an open eNB (O-eNB) 261, via an O1 interface. Additionally, in some implementations, the SMO Framework 255 can communicate directly with one or more RUs 287 via an O1 interface. The SMO Framework 255 also may include a Non-RT RIC 257 configured to support functionality of the SMO Framework 255.

The Non-RT RIC 257 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 259. The Non-RT RIC 257 may be coupled to or communicate with (such as via an A1 interface) the Near-RT RIC 259. The Near-RT RIC 259 may be configured to include a logical function that enables near-real-time control and optimization of RAN elements and resources via data collection and actions over an interface (such as via an E2 interface) connecting one or more CUs 280, one or more DUs 285, or both, as well as an O-eNB, with the Near-RT RIC 259.

In some implementations, to generate AI/ML models to be deployed in the Near-RT RIC 259, the Non-RT RIC 257 may receive parameters or external enrichment information from external servers. Such information may be utilized by the Near-RT RIC 259 and may be received at the SMO Framework 255 or the Non-RT RIC 257 from non-network data sources or from network functions. In some examples, the Non-RT RIC 257 or the Near-RT RIC 259 may be configured to tune RAN behavior or performance. For example, the Non-RT RIC 257 may monitor long-term trends and patterns for performance and employ AI/ML models to perform corrective actions through the SMO Framework 255 (such as reconfiguration via O1) or via creation of RAN management policies (such as A1 policies).

Figure 3A:
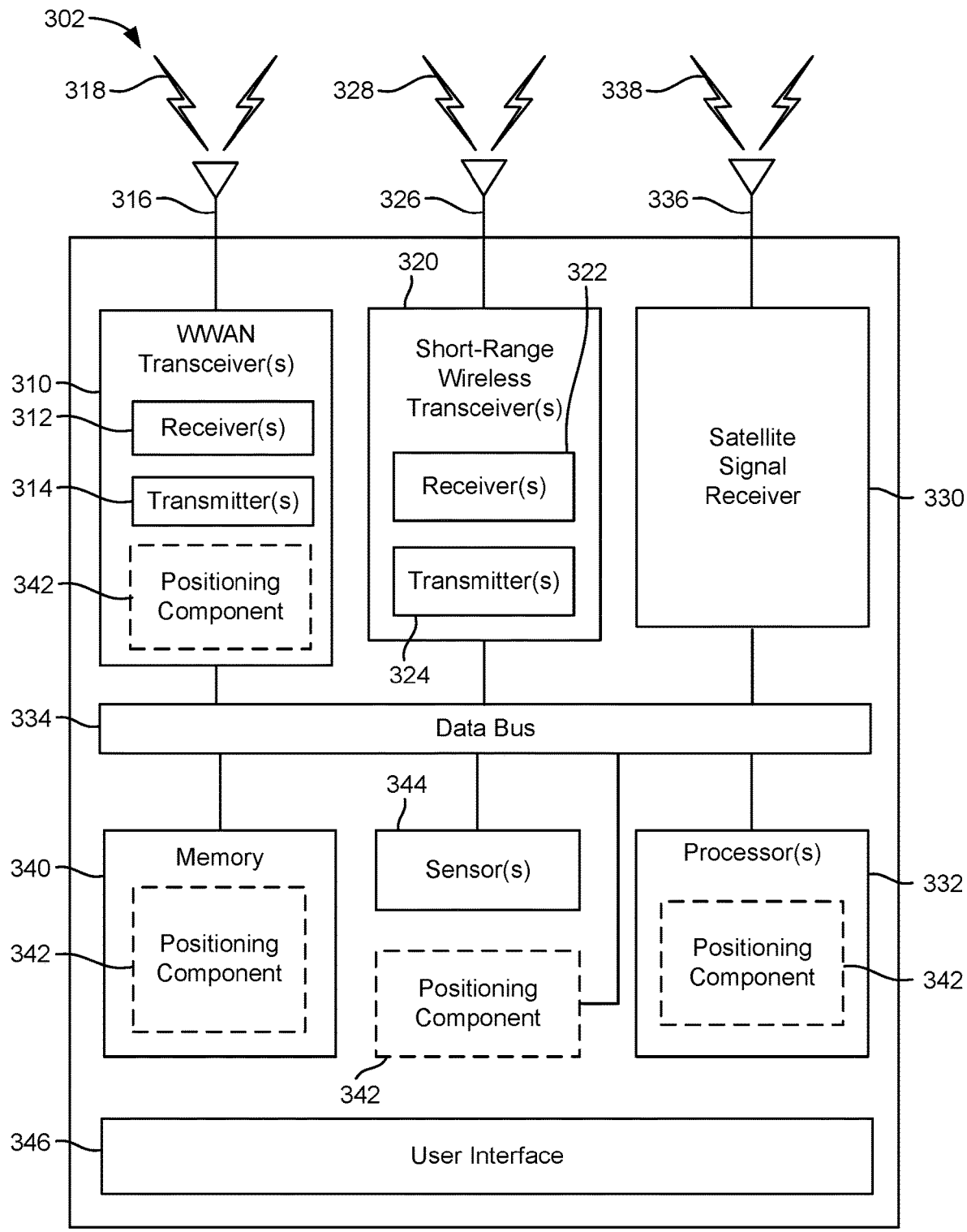
FIGS. 3A, 3B, and 3C are simplified block diagrams of several sample aspects of components that may be employed in a user equipment (UE), a base station, and a network entity, respectively, and configured to support communications as taught herein.
Figure 3B:
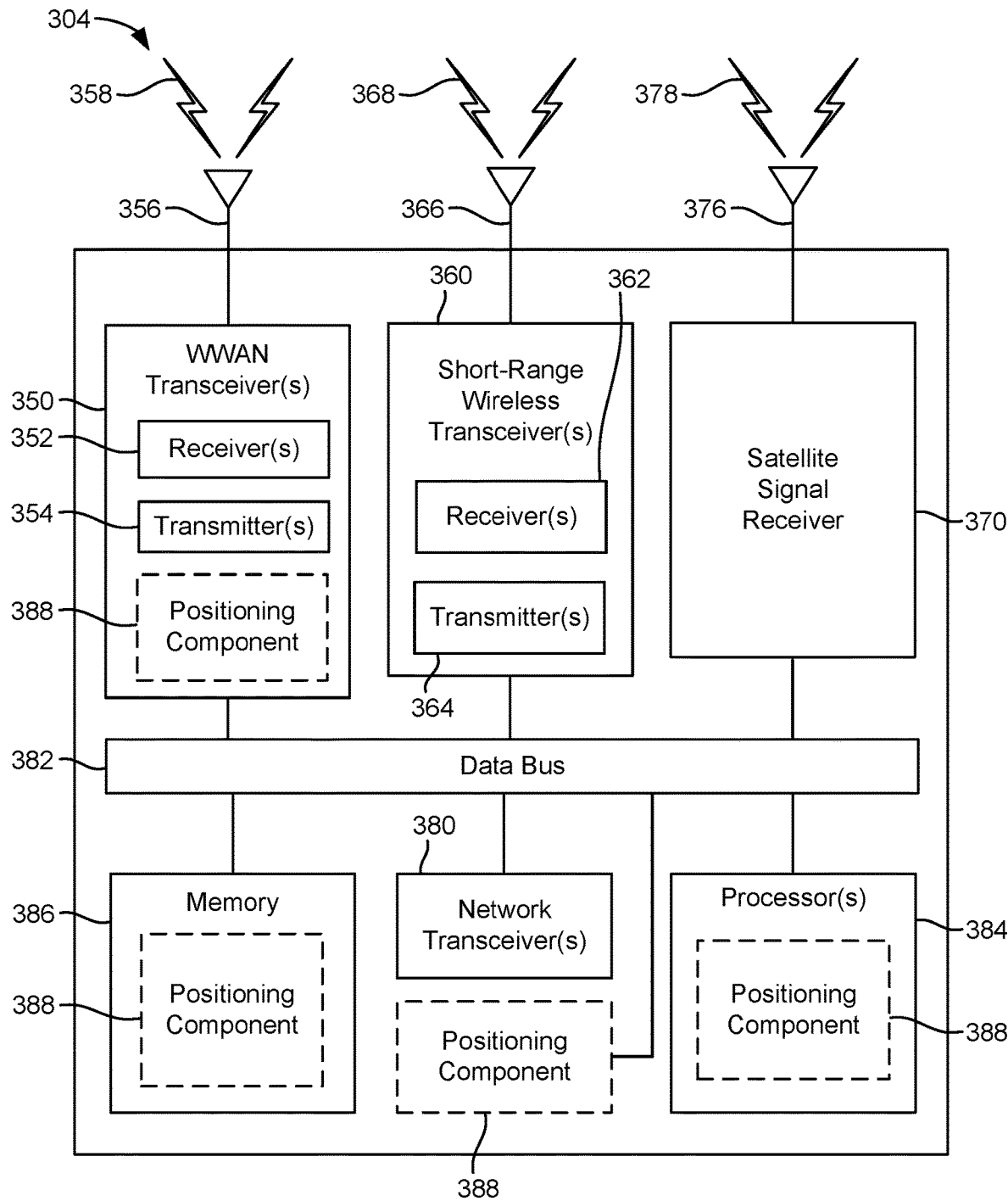
Figure 3C:
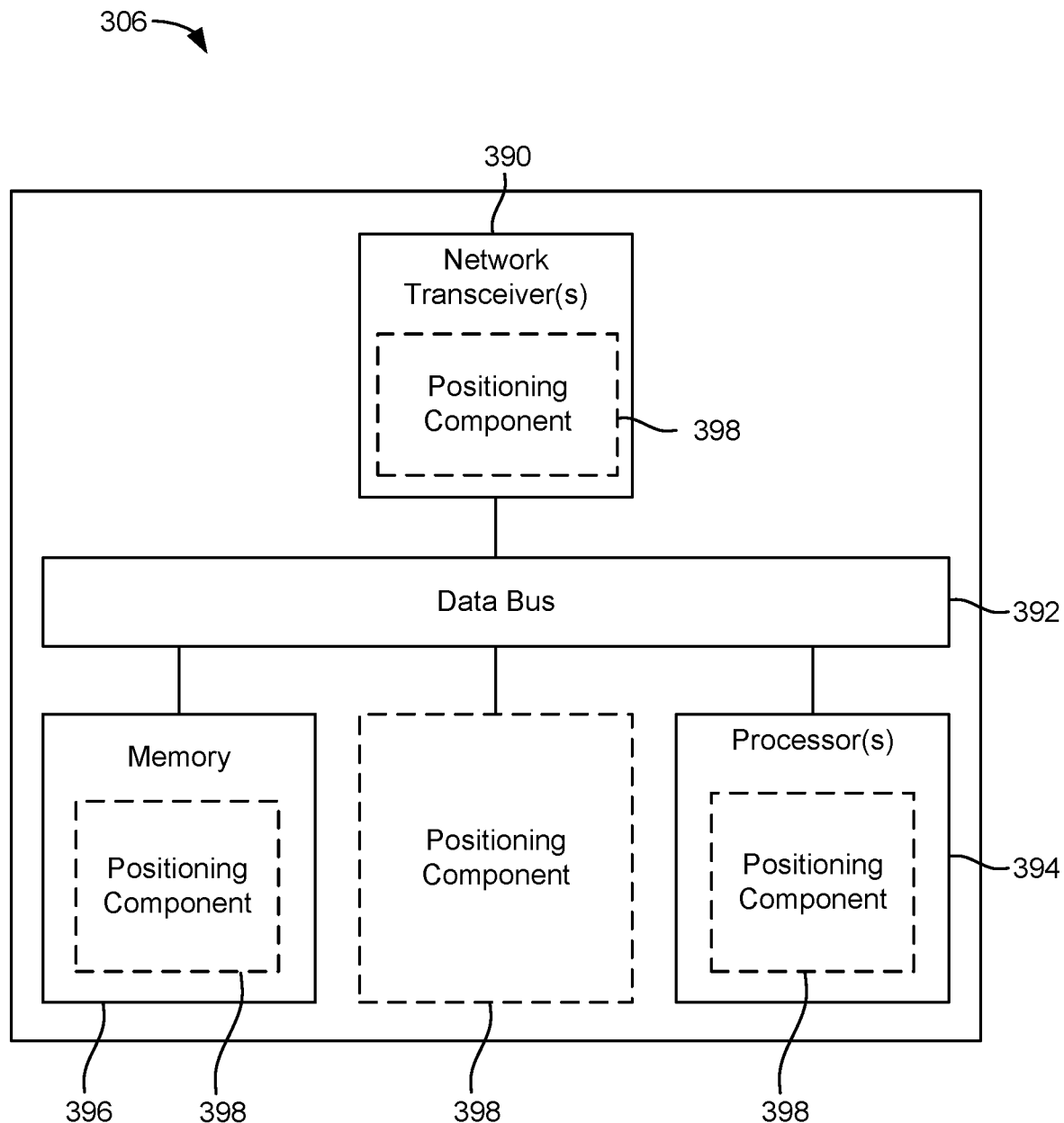

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), ultra-wideband (UWB), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, UWB transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the downlink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite signal receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
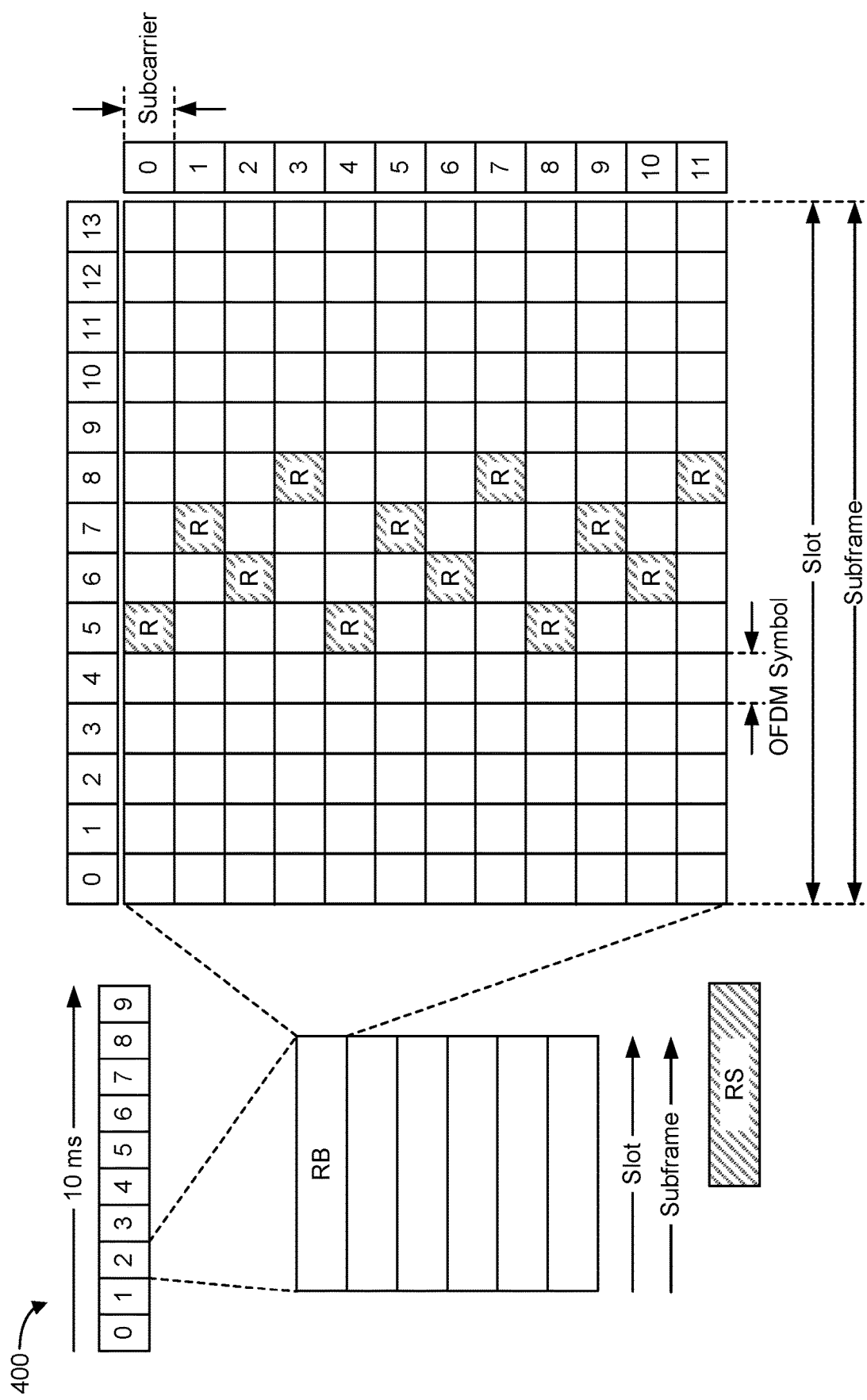
FIG. 4 is a diagram illustrating an example frame structure, according to aspects of the disclosure.

Various frame structures may be used to support downlink and uplink transmissions between network nodes (e.g., base stations and UEs). FIG. 4 is a diagram 400 illustrating an example frame structure, according to aspects of the disclosure. The frame structure may be a downlink or uplink frame structure. Other wireless communications technologies may have different frame structures and/or different channels.

LTE, and in some cases NR, utilizes orthogonal frequency-division multiplexing (OFDM) on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal fast Fourier transform (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu=0$), 30 kHz ($\mu=1$), 60 kHz ($\mu=2$), 120 kHz ($\mu=3$), and 240 kHz ($\mu=4$) or greater may be available. In each subcarrier spacing, there are 14 symbols per slot. For 15 kHz SCS ($\mu=0$), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu=1$), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu=2$), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu=3$), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu=4$), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIG. 4, a numerology of 15 kHz is used. Thus, in the time domain, a 10 ms frame is divided into 10 equally sized subframes of 1 ms each, and each subframe includes one time slot. In FIG. 4, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4 illustrates example locations of REs carrying a reference signal (labeled "R").

In an aspect, the reference signal carried on the REs labeled "R" in FIG. 4 may be SRS. SRS transmitted by a UE may be used by a base station to obtain the channel state information (CSI) for the transmitting UE. CSI describes how an RF signal propagates from the UE to the base station and represents the combined effect of scattering, fading, and power decay with distance. The system uses the SRS for resource scheduling, link adaptation, massive MIMO, beam management, etc.

A collection of REs that are used for transmission of SRS is referred to as an "SRS resource," and may be identified by the parameter "SRS-ResourceId." The collection of resource elements can span multiple PRBs in the frequency domain and 'N' (e.g., one or more) consecutive symbol(s) within a slot in the time domain. In a given OFDM symbol, an SRS resource occupies one or more consecutive PRBs. An "SRS resource set" is a set of SRS resources used for the transmission of SRS signals, and is identified by an SRS resource set ID ("SRS-ResourceSetId").

The transmission of SRS resources within a given PRB has a particular comb size (also referred to as the "comb density"). A comb size 'N' represents the subcarrier spacing (or frequency/tone spacing) within each symbol of an SRS resource configuration. Specifically, for a comb size 'N,' SRS are transmitted in every Nth subcarrier of a symbol of a PRB. For example, for comb-4, for each symbol of the SRS resource configuration, REs corresponding to every fourth subcarrier (such as subcarriers 0, 4, 8) are used to transmit SRS of the SRS resource. In the example of FIG. 4, the illustrated SRS is comb-4 over four symbols. That is, the locations of the shaded SRS REs indicate a comb-4 SRS resource configuration.

Currently, an SRS resource may span 1, 2, 4, 8, or 12 consecutive symbols within a slot with a comb size of comb-2, comb-4, or comb-8. The following are the frequency offsets from symbol to symbol for the SRS comb patterns that are currently supported. 1-symbol comb-2: {0}; 2-symbol comb-2: {0, 1}; 2-symbol comb-4: {0, 2}; 4-symbol comb-2: {0, 1, 0, 1}; 4-symbol comb-4: {0, 2, 1, 3} (as in the example of FIG. 4); 8-symbol comb-4: {0, 2, 1, 3, 0, 2, 1, 3}; 12-symbol comb-4: {0, 2, 1, 3, 0, 2, 1, 3, 0, 2, 1, 3}; 4-symbol comb-8: {0, 4, 2, 6}; 8-symbol comb-8: {0, 4, 2, 6, 1, 5, 3, 7}; and 12-symbol comb-8: {0, 4, 2, 6, 1, 5, 3, 7, 0, 4, 2, 6}.

Generally, as noted above, a UE transmits SRS to enable the receiving base station (either the serving base station or a neighboring base station) to measure the channel quality (i.e., CSI) between the UE and the base station. However, SRS can also be specifically configured as uplink positioning reference signals for uplink-based positioning procedures, such as uplink time difference of arrival (UL-TDOA), round-trip-time (RTT), uplink angle-of-arrival (UL-AoA), etc. As used herein, the term "SRS" may refer to SRS configured for channel quality measurements or SRS configured for positioning purposes. The former may be referred to herein as "SRS-for-communication" and/or the latter may be referred to as "SRS-for-positioning" or "positioning SRS" when needed to distinguish the two types of SRS.

Several enhancements over the previous definition of SRS have been proposed for SRS-for-positioning (also referred to as "UL-PRS"), such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There also may be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through a MAC control element (MAC-CE) or downlink control information (DCI)).

Figure 5:
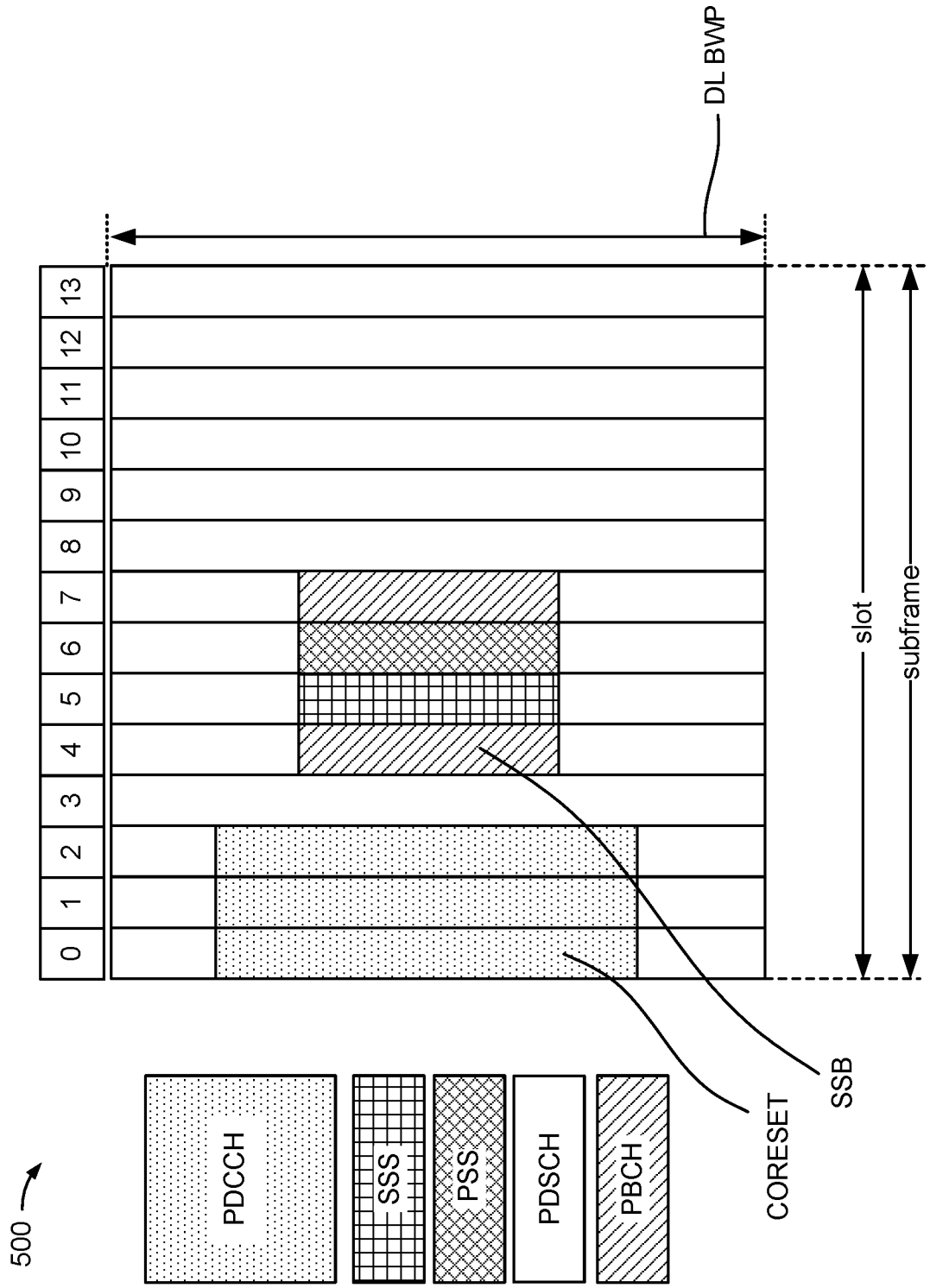
FIG. 5 is a diagram illustrating various downlink channels within an example downlink slot, according to aspects of the disclosure.

FIG. 5 is a diagram 500 illustrating various downlink channels within an example downlink slot. In FIG. 5, time is represented horizontally (on the X axis) with time increasing from left to right, while frequency is represented vertically (on the Y axis) with frequency increasing (or decreasing) from bottom to top. In the example of FIG. 5, a numerology of 15 kHz is used. Thus, in the time domain, the illustrated slot is one millisecond (ms) in length, divided into 14 symbols.

In NR, the channel bandwidth, or system bandwidth, is divided into multiple bandwidth parts (BWPs). A BWP is a contiguous set of RBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 5, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries a master information block (MIB), may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 5, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 5 is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., physical uplink shared channel (PUSCH)). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

Figure 6:
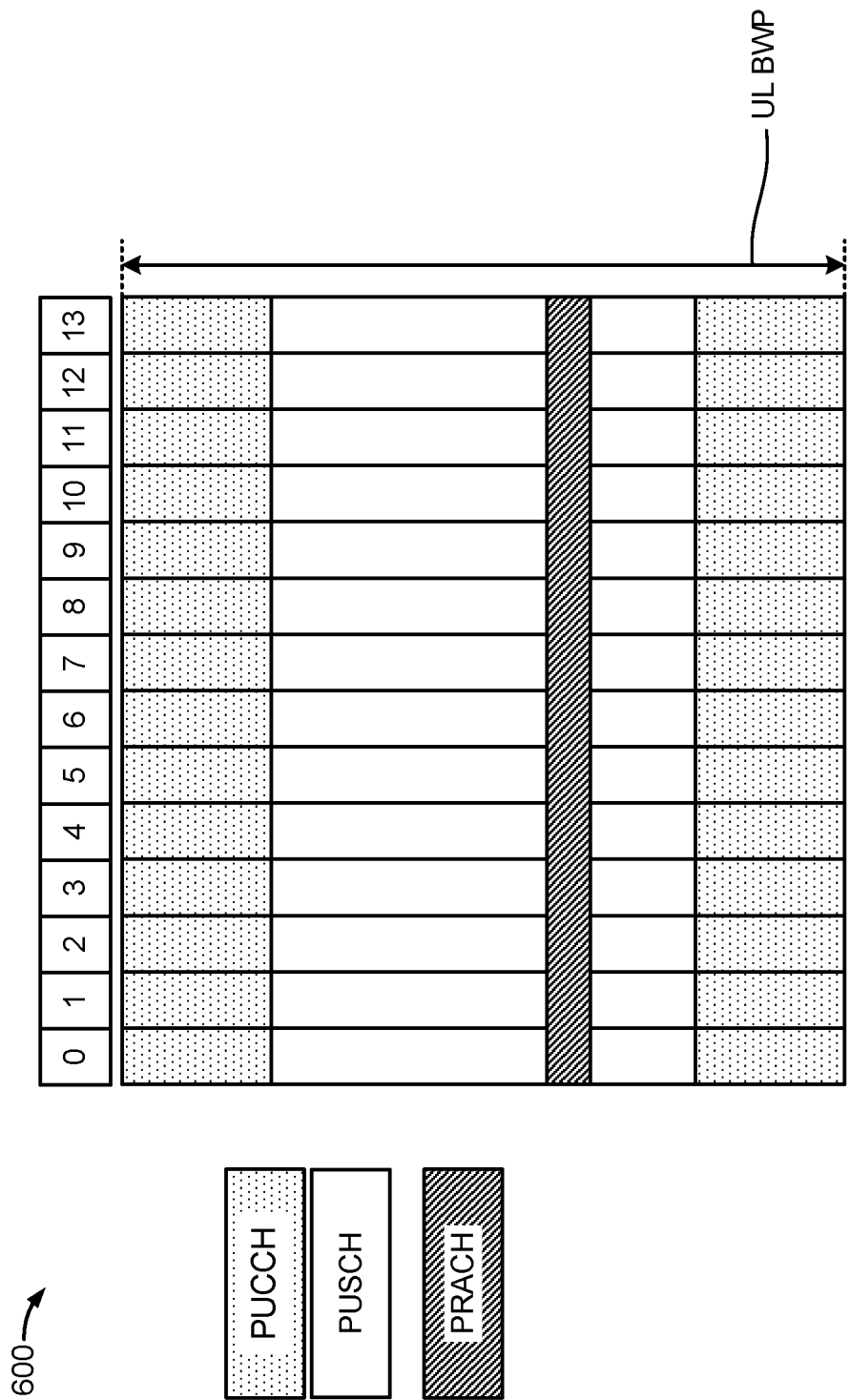
FIG. 6 is a diagram illustrating various uplink channels within an example uplink slot, according to aspects of the disclosure.

FIG. 6 is a diagram 600 illustrating various uplink channels within an example uplink slot. In FIG. 6, time is represented horizontally (on the X axis) with time increasing from left to right, while frequency is represented vertically (on the Y axis) with frequency increasing (or decreasing) from bottom to top. In the example of FIG. 6, a numerology of 15 kHz is used. Thus, in the time domain, the illustrated slot is one millisecond (ms) in length, divided into 14 symbols.

A random-access channel (RACH), also referred to as a physical random-access channel (PRACH), may be within one or more slots within a frame based on the PRACH configuration. The PRACH may include six consecutive RB pairs within a slot. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

Figure 7:
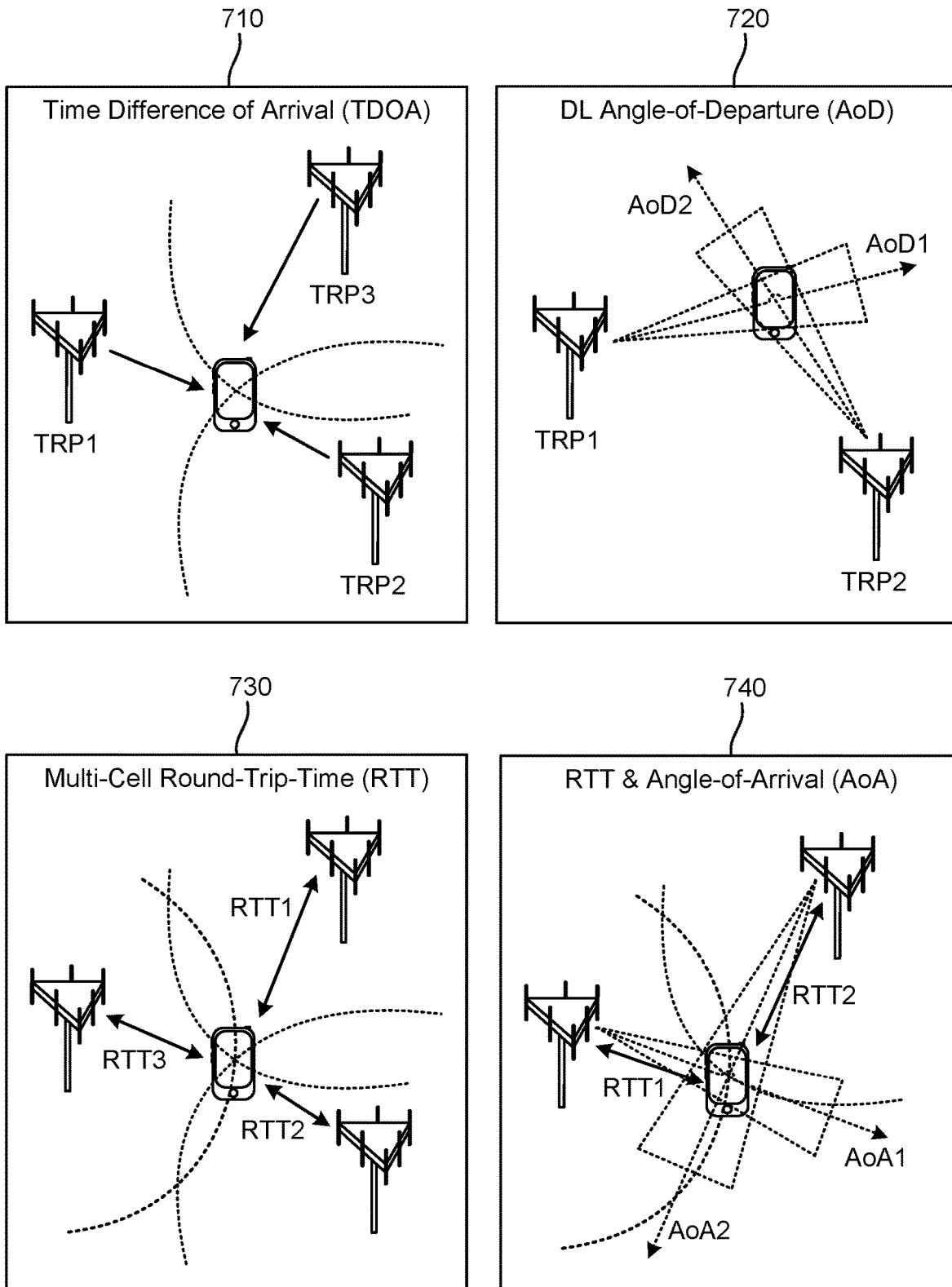
FIG. 7 illustrates examples of various positioning methods supported in New Radio (NR), according to aspects of the disclosure.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. FIG. 7 illustrates examples of various positioning methods, according to aspects of the disclosure. In an OTDOA or DL-TDOA positioning procedure, illustrated by scenario 710, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, illustrated by scenario 720, the positioning entity uses a measurement report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE to multiple base stations. Specifically, a UE transmits one or more uplink reference signals that are measured by a reference base station and a plurality of non-reference base stations. Each base station then reports the reception time (referred to as the relative time of arrival (RTOA)) of the reference signal(s) to a positioning entity (e.g., a location server) that knows the locations and relative timing of the involved base stations. Based on the reception-to-reception (Rx-Rx) time difference between the reported RTOA of the reference base station and the reported RTOA of each non-reference base station, the known locations of the base stations, and their known timing offsets, the positioning entity can estimate the location of the UE using TDOA.

For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest slot boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, illustrated by scenario 730, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy, as illustrated by scenario 740.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive slots including PRS, periodicity of the consecutive slots including PRS, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

In typical communication scenarios, UEs communicate directly with serving cells (e.g., gNBs) via DL signals and UL signals, as noted above. In some designs, to enhance UL performance (e.g., especially due to limited UL power from the UEs), a UL "dense" deployment may be used whereby one or more UL relays are used to relay UL signals from UEs (e.g., edge-located UEs, etc.) to the serving cell. In an example, the UL relay(s) may be attached to the serving cell. In some designs, the UL relays may be deployed densely, so a relatively close UL relay is available to UEs in the serving cell at a number of cell locations (e.g., which may help to reduce the UL power requirement for UEs).

Figure 8:
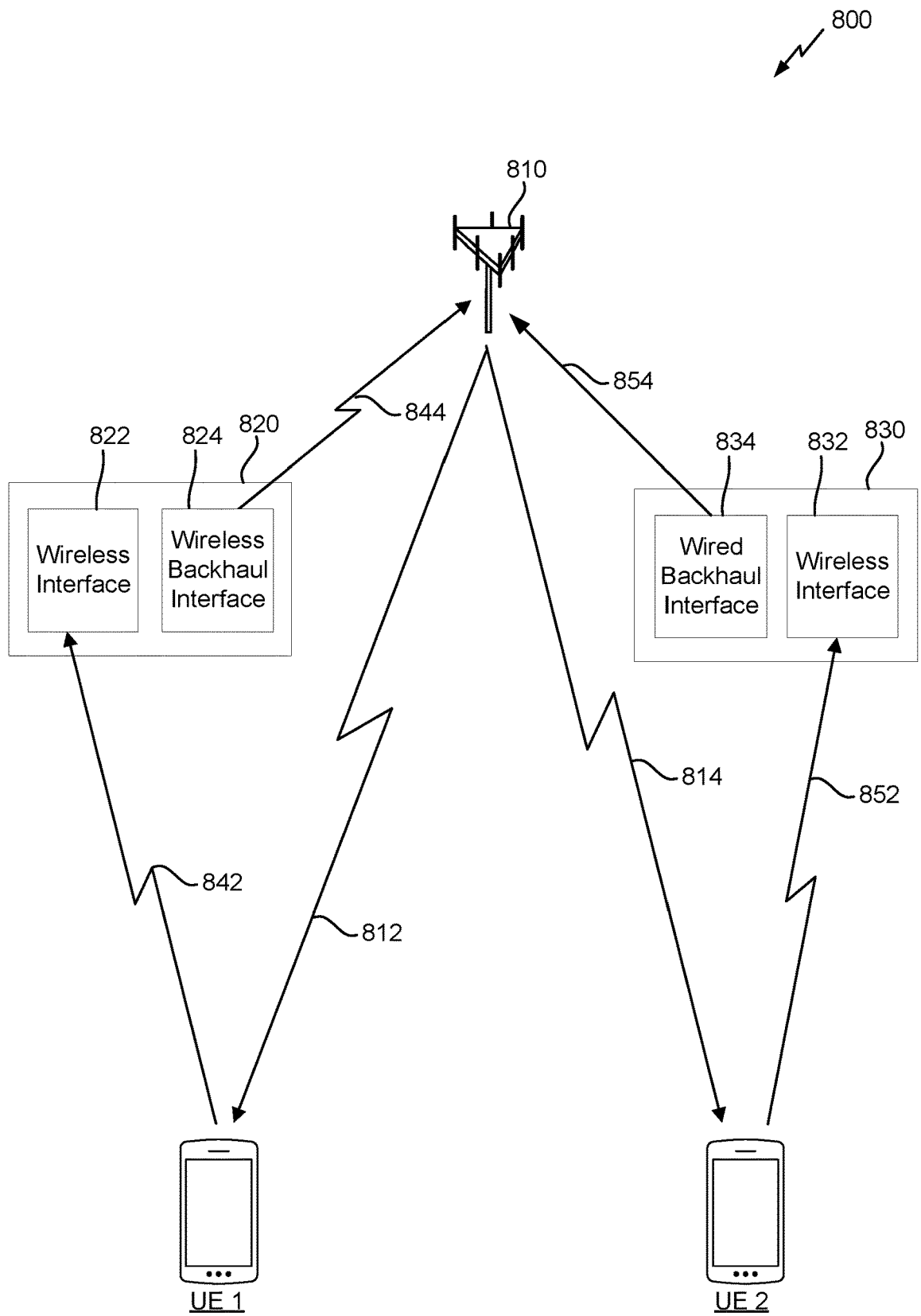
FIG. 8 illustrates a UL relay deployment in accordance with aspects of the disclosure.

FIG. 8 illustrates a UL relay deployment 800 in accordance with aspects of the disclosure. In FIG. 8, UEs 1 and 2 are communicating with gNB 810. In particular, on the DL, DL signals 812 and 814 are transmitted by gNB 810 directly to UEs 1 and 2. However, the UL signaling is mediated by UL relays 820 and 830. UL relay 820 includes a wireless interface 822 (e.g., for receiving UL signals from UEs) and a wireless backhaul interface 824 (e.g., for forwarding any detected UL signals to gNB 810 as wireless signals). UL relay 830 includes a wireless interface 832 (e.g., for receiving UL signals from UEs) and a wired backhaul interface 834 (e.g., for forwarding any detected UL signals to gNB 810 as wired signals). UE 1 transmits UL signal(s) 842 to the wireless interface 822 of UL relay 820, which wirelessly relays the UL signal(s) to gNB 810 via the wireless backhaul interface 824 at 844. UE 2 transmits UL signal(s) 852 to the wireless interface 832 of UL relay 830, which relays the UL signal(s) to gNB 810 via the wired backhaul interface 834 at 854. In some designs, the UL relay 820 and/or the UL relay 830 may correspond to a network component (e.g., a version of BS 304, a roadside unit, etc.). In some designs, the UL relay 820 may correspond to a UE (e.g., UE 302).

In some designs, UL relays may implement a resource reuse scheme (e.g., UEs in a coverage area of a serving cell may communicate with different UL relays using the same resources or RBs). In this case, UL interference may be a consideration. In other designs, resources may be shared by UL relays to reduce interference (e.g., for a particular RB, only one UL relay may use that RB at a particular time).

In current implementations, UL relays are used to relay UL communication only, and are not used to facilitate other functionality such as position estimation of UEs. Aspects of the disclosure are thereby directed to leveraging UL relays to improve position estimation of UEs. In a particular aspect, UL relays may be configured to measure UL SRS for positioning from UE(s), and to report the UL SRS measurements to a position estimation entity. Such aspects may provide various technical advantages, such as improved position estimation of UEs, reduced power consumption of UEs (e.g., since UEs may transmit SRS at lower power since the UL relays are closer to the UEs than neighbor gNBs), and so on.

Figure 9:
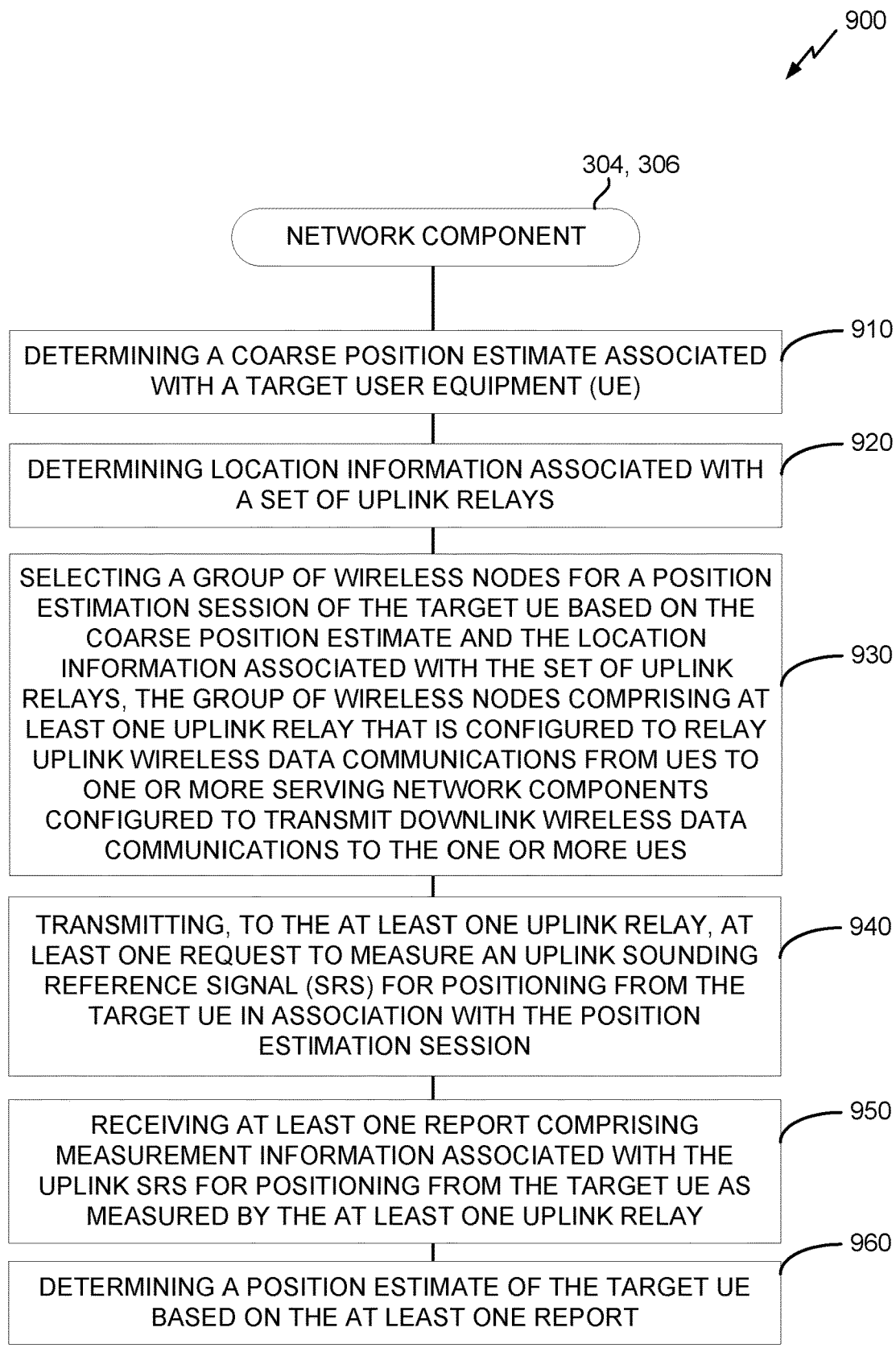
FIG. 9 illustrates an exemplary process of communications according to an aspect of the disclosure.

FIG. 9 illustrates an exemplary process 900 of communications according to an aspect of the disclosure. The process 900 of FIG. 9 is performed by a network component, as a position estimation entity (e.g., BS 304, an O-RAN component such as RU or CU or DU, an LMF implemented at BS 304 or at a network entity 306, etc.)

Referring to FIG. 9, at 910, the network component (e.g., processor(s) 384 or 394, positioning component 388 or 398, etc.) determines a coarse position estimate associated with a target UE. For example, the coarse position estimate may correspond to (or be based on) a recent (e.g., previous) position estimate of the target UE, a set of UL relays or other UEs that are in communication range of the target UE's UL signals, beam(s) being used by the gNB for DL communication with the target UE, and so on. Generally, in an example, the coarse position estimate may be sufficient to identify a few UL relays that are in range of an SRS transmission from the target UE (e.g., an SRS transmission at a relatively low power level, e.g., lower than a transmission power level that would be needed by the UE to transmit directly to a serving network component or gNB).

Referring to FIG. 9, at 920, the network component (e.g., processor(s) 384 or 394, positioning component 388 or 398, etc.) determines location information associated with a set of uplink relays. The determination at 920 may be performed in a variety of ways. For example, the set of uplink relays may be associated with a serving network component (e.g., gNB) that manages the set of uplink relays. The serving network component may report the location information associated with the set of uplink relays to the network component to facilitate the determination at 920. In other aspects, the network component that performs the process 900 of FIG. 9 may correspond to the serving network component. In other designs, the set of uplink relays may register directly with the network component, in which case the location information is obtained from the set of uplink relays. In yet other designs, the location information may be determined from position estimation procedures (e.g., RTT-based position estimation, TDOA-based position estimation, AoA/AoD-based position estimation, etc.). For example, such position estimation procedures may be used for non-stationary uplink relays (e.g., UEs).

Referring to FIG. 9, at 930, the network component (e.g., processor(s) 384 or 394, positioning component 388 or 398, etc.) selects a group of wireless nodes for a position estimation session of the target UE based on the coarse position estimate and the location information associated with the set of uplink relays, the group of wireless nodes comprising at least one uplink relay that is configured to relay uplink wireless data communications from UEs to one or more serving network components configured to transmit downlink wireless data communications to the one or more UEs. In some designs, the group of wireless nodes may consist only of uplink relays. In other designs, the group of wireless nodes may include uplink relay(s) and other device types, such as other UE(s) (e.g., position estimation via sidelink signaling), or even gNB(s) (e.g., serving gNB, non-serving gNB(s), etc.).

Referring to FIG. 9, at 940, the network component (e.g., transmitter 354 or 364, network transceiver(s) 380 or 390, etc.) transmits, to the at least one uplink relay, at least one request to measure an uplink sounding reference signal (SRS) for positioning from the target UE in association with the position estimation session.

Referring to FIG. 9, at 950, the network component (e.g., receiver 352 or 362, network transceiver(s) 380 or 390, etc.) receives at least one report comprising measurement information associated with the uplink SRS for positioning from the target UE as measured by the at least one uplink relay.

Referring to FIG. 9, at 960, the network component (e.g., processor(s) 384 or 394, positioning component 388 or 398, etc.) determines a position estimate of the target UE based on the at least one report.

Referring to FIG. 9, in an aspect, the network component corresponds to a location management function (LMF). In some designs, presence information associated with the set of uplink relays, the location information associated with the set of uplink relays, or both, is received at the LMF from a serving network component (e.g., serving gNB) of the target UE. For example, the presence information associated with the set of uplink relays, the location information associated with the set of uplink relays, or both, is received at the LMF from the serving network component of the target UE via NR Positioning Protocol A (NRPPa) signaling or Long Term Evolution Positioning Protocol A (LPPa) signaling. In some designs, the LMF further transmits, to a serving network component (e.g., serving gNB) of the target UE, a request to enable an SRS measurement mode of the at least one uplink relay. In an example, the request to enable the SRS measurement mode of the at least one uplink relay is transmitted via NR Positioning Protocol A (NRPPa) signaling or Long Term Evolution Positioning Protocol A (LPPa) signaling. In some designs, the at least one report comprises combined information associated with measurement information from multiple uplink relays. In some designs, the at least one report is received from the at least one uplink relay or from a serving network component (e.g., serving gNB of the target UE).

Referring to FIG. 9, in another aspect, the network component corresponds to a serving network component (e.g., serving gNB) of the target UE. In this case, in an example, the coarse position estimate is received at the serving network component from a location management function (LMF).

Referring to FIG. 9, in some designs, the selection at 930 is based in part upon a number of network components that are associated with each of the set of uplink relays. For example, the selection may be weighted to favor selection of uplink relays that are associated with a higher number of network components (e.g., select an uplink relay associated with two gNBs over an uplink relay associated with a single gNB, etc.).

Referring to FIG. 9, in some designs, a transmission power level for the uplink SRS for positioning may be determined by the network component based on location information associated with the group of wireless nodes selected at 930.

Referring to FIG. 9, in some designs, the at least one uplink relay includes a single uplink relay. In other designs, the at least one uplink relay includes multiple uplink relays.

Referring to FIG. 9, in some designs, the network component may further transmit, to the target UE, a beam configuration associated with transmission of the uplink SRS for positioning.

Figure 10:
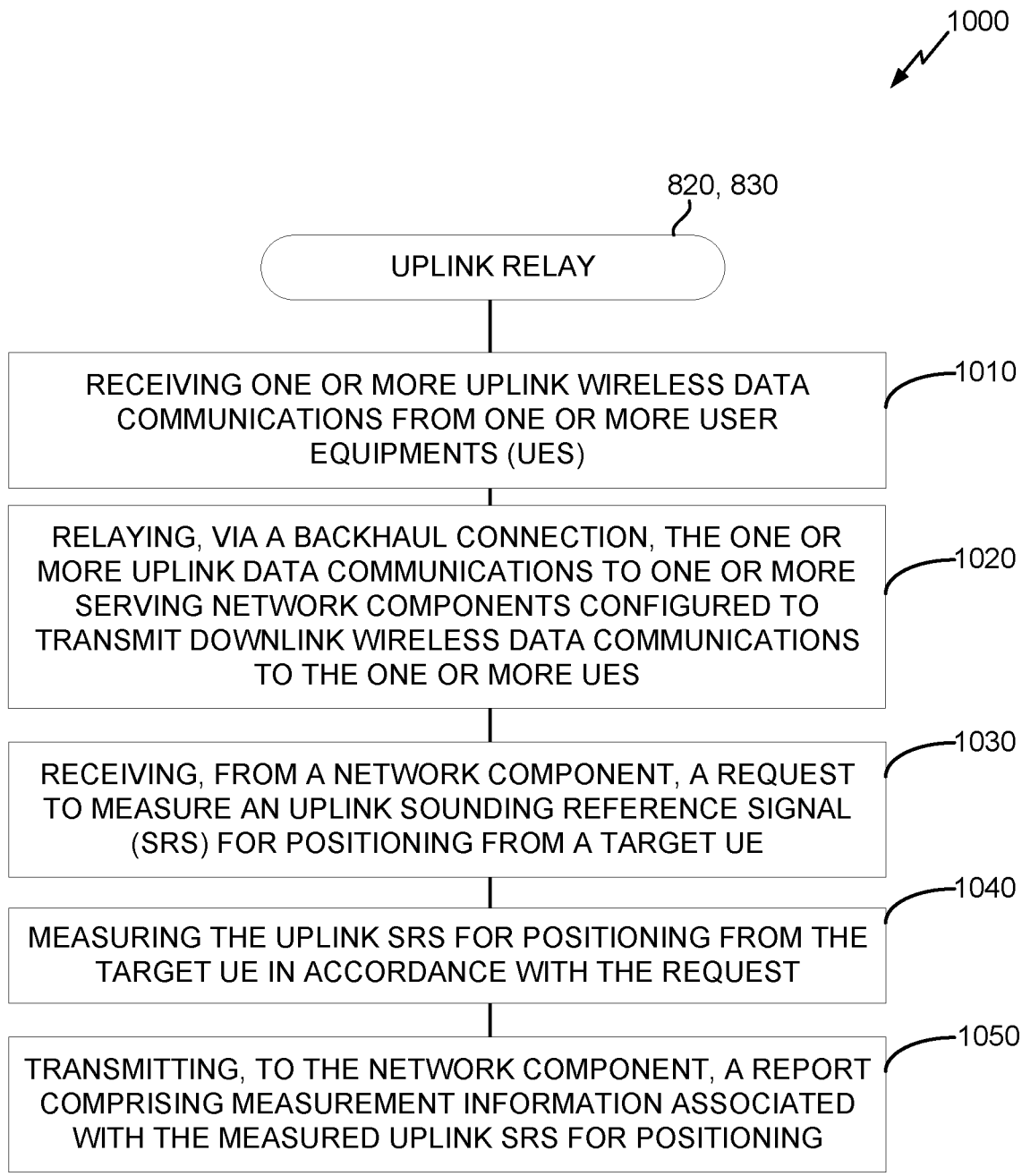
FIG. 10 illustrates an exemplary process of communications according to an aspect of the disclosure.

FIG. 10 illustrates an exemplary process 1000 of communications according to an aspect of the disclosure. The process 1000 of FIG. 10 is performed by an uplink relay, such as uplink relay 820 or 830, which as noted above may correspond to an example implementation of UE 302, BS 304, an O-RAN component such as RU, and so on.

Referring to FIG. 10, at 1010, the uplink relay (e.g., receiver 312 or 322 or 352 or 362, network transceiver 380, wireless backhaul interface 824, wired backhaul interface 834, etc.) receives, one or more uplink wireless data communications from one or more user equipments (UEs).

Referring to FIG. 10, at 1020, the uplink relay (e.g., transmitter 314 or 324 or 354 or 364, network transceiver 380, wireless backhaul interface 824, wired backhaul interface 834, etc.) relays, via a backhaul connection, the one or more uplink data communications to one or more serving network components configured to transmit downlink wireless data communications to the one or more UEs.

Referring to FIG. 10, at 1030, the uplink relay (e.g., receiver 312 or 322 or 352 or 362, network transceiver 380, wireless backhaul interface 824, wired backhaul interface 834, etc.) receives, from a network component, a request to measure an uplink sounding reference signal (SRS) for positioning from a target UE.

Referring to FIG. 10, at 1040, the uplink relay (e.g., receiver 312 or 322 or 352 or 362, network transceiver 380, wireless backhaul interface 824, wired backhaul interface 834, etc.) measures the uplink SRS for positioning from the target UE in accordance with the request. For example, the SRS measurement(s) at 1040 may include TOA or TDOA measurements, RTT measurements, AoA/AoD measurements, and so on.

Referring to FIG. 10, at 1050, the uplink relay (e.g., transmitter 314 or 324 or 354 or 364, network transceiver 380, wireless backhaul interface 824, wired backhaul interface 834, etc.) transmits, to the network component, a report comprising measurement information associated with the measured uplink SRS for positioning.

Referring to FIG. 10, in some designs, the network component corresponds to a location management function (LMF) or a serving network component (e.g., serving gNB) of the target UE. In some designs, the uplink relay is closer to the target UE than a serving network component (e.g., serving gNB) of the target UE. For example, the various uplink relay(s) selected at 930 of FIG. 9 for the position estimation procedure may be within a relatively small location region "A" around the target UE. In an aspect, the target UE may be configured to transmit the UL SRS with lower transmission power (e.g., than would be necessary to transmit the UL SRS for measurement by the serving gNB and/or neighboring gNBs). In some designs, the backhaul connection comprises a wireless backhaul connection. In other designs, the backhaul connection comprises a wired backhaul connection.

Figure 11:
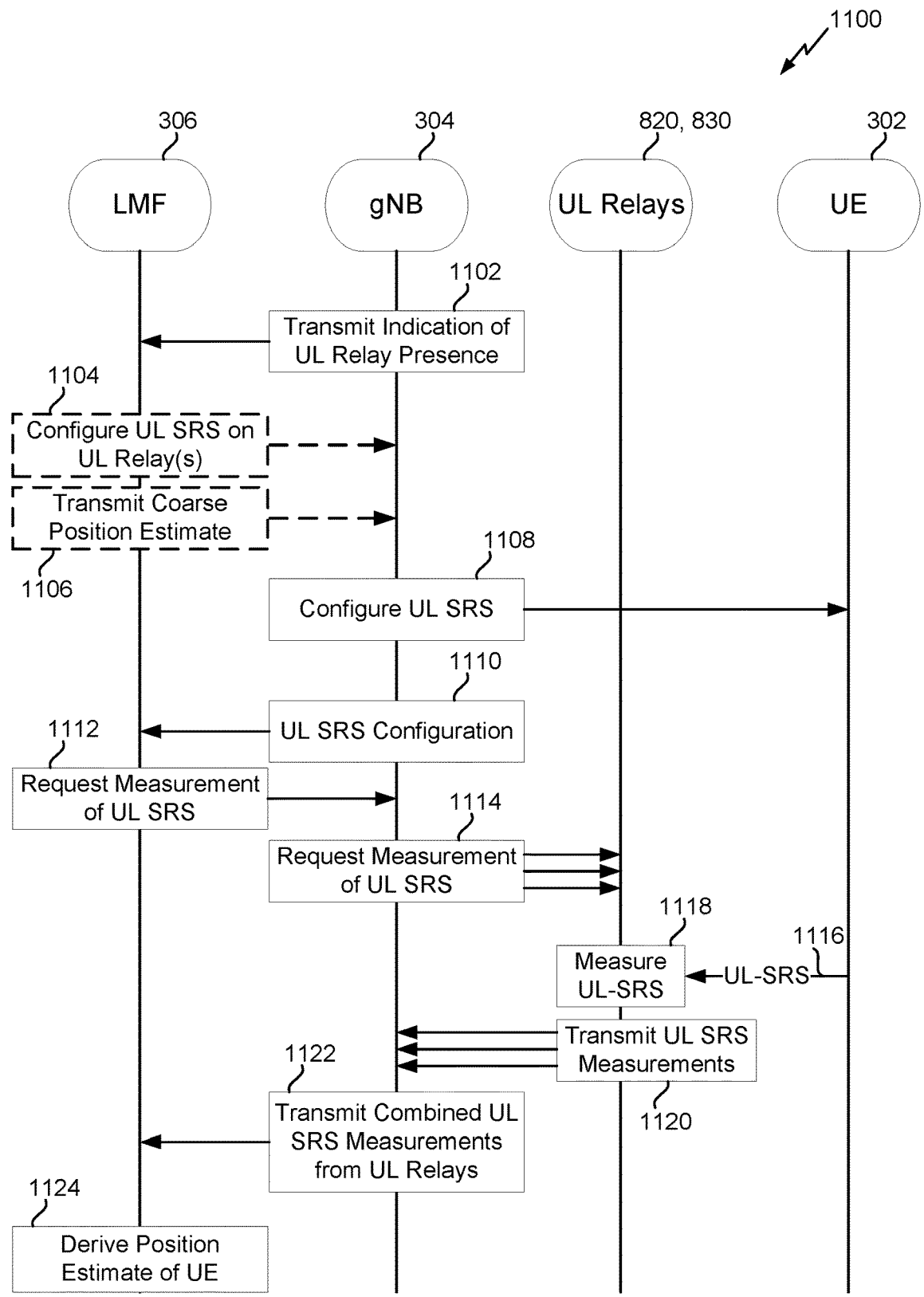
FIG. 11 illustrates an example implementation of the processes of FIGS. 9-10, in accordance with aspects of the disclosure.

FIG. 11 illustrates an example implementation 1100 of the processes 900-1000 of FIGS. 9-10, in accordance with aspects of the disclosure. In the example implementation 1100 of FIG. 11, the network component corresponds to LMF 306, the serving network component corresponds to gNB 304, the set of UL relays includes a plurality of UL relays that are each configured as either UL relay 820 or UL relay 830, and the target UE corresponds to UE 302.

At 1102, gNB 304 transmits an indication of UE relay presence associated with the set of UL relays to the LMF 306 (e.g., the availability, location, etc. of the set of UL relays). At 1102, the LMF 306 optionally configures UL SRS on the set of UL relays. In an aspect, the set of UL relays may be selected by the LMF 306 based on a coarse position estimate of UE 302. Alternatively, at 1106, the LMF 306 may optionally transmit the coarse position estimate of UE 302 to the gNB 304, which in turn selects the set of UL relays for the position estimation procedure. In either case, at 1108, the gNB 304 transmits an SRS configuration for the UE 302 to transmit the UL SRS. In an aspect, the SRS configuration may be associated with a reduced transmission power level, a directional configuration (e.g., a beam configuration) based on the UL relay location(s), and so on. At 1110, the gNB 304 shares the UL SRS configuration with the LMF 306. At 1112, the LMF 306 transmits, to the gNB 304, a request for the selected set of UL relay(s) to measure the UL SRS. At 1114, the gNB 304 transmits, to each UL relay in the select set of UL relay(s), a request to measure the UL SRS. At 1116, UE 302 transmits the UL SRS, which is measured by the selected set of UL relay(s) at 1118. At 1120, the selected set of UL relay(s) transmits the UL SRS measurements to the gNB 304. At 1122, the gNB 304 transmits the combined UL SRS measurements from the selected set of UL relay(s) to the LMF 306. At 1124, the LMF 306 derives a position estimate of UE 302 based at least in part on the combined UL SRS measurements from the selected set of UL relay(s).

Figure 12:
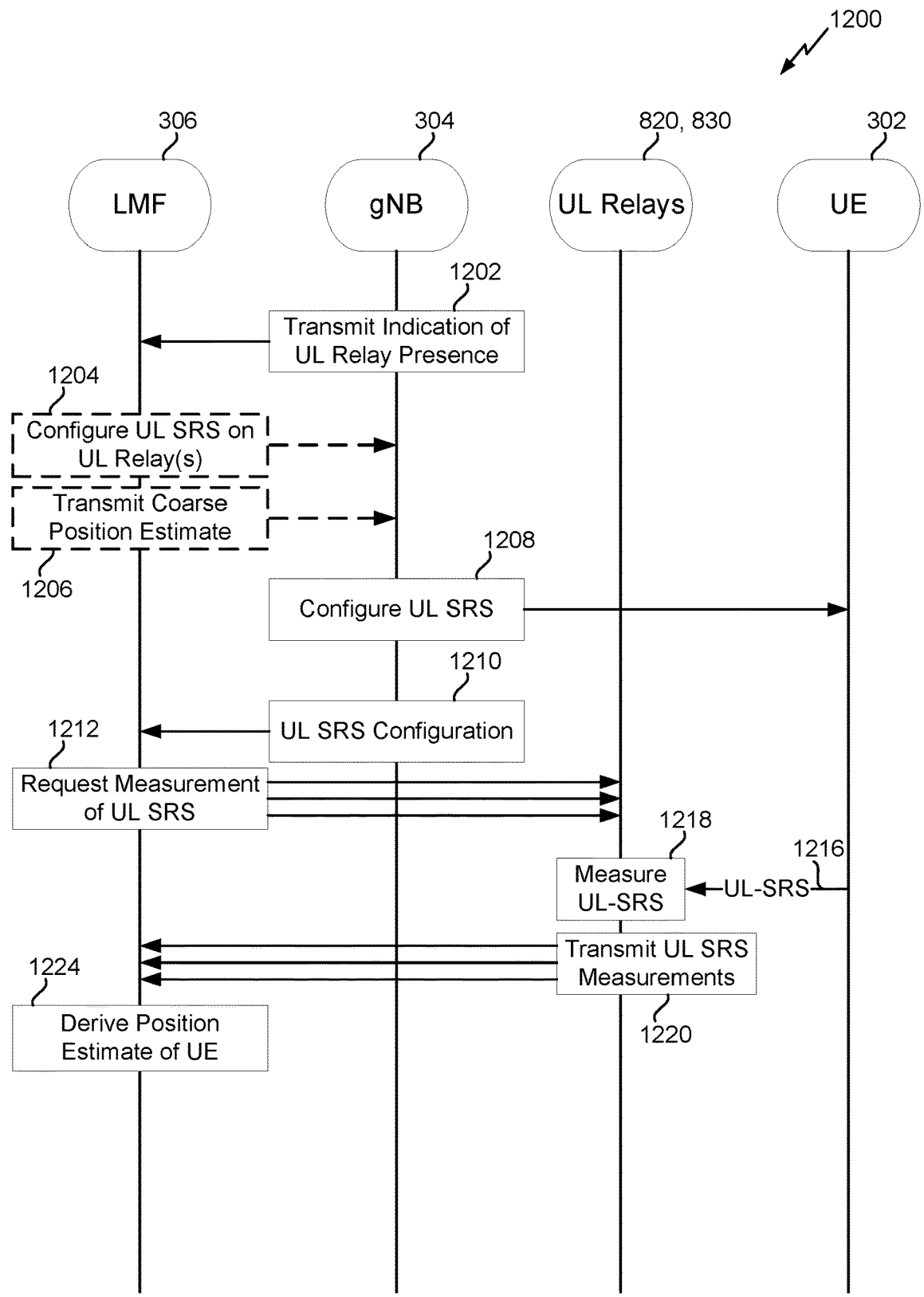
FIG. 12 illustrates an example implementation of the processes of FIGS. 9-10, in accordance with aspects of the disclosure.

FIG. 12 illustrates an example implementation 1200 of the processes 900-1000 of FIGS. 9-10, in accordance with aspects of the disclosure. In the example implementation 1200 of FIG. 12, the network component corresponds to LMF 306, the serving network component corresponds to gNB 304, the set of UL relays includes a plurality of UL relays that are each configured as either UL relay 820 or UL relay 830, and the target UE corresponds to UE 302. Unlike FIG. 11, in FIG. 12, the LMF 306 is capable of direct communication with the UL relay(s).

At 1202, gNB 304 transmits an indication of UE relay presence associated with the set of UL relays to the LMF 306 (e.g., the availability, location, etc. of the set of UL relays). At 1202, the LMF 306 optionally configures UL SRS on the set of UL relays. In an aspect, the set of UL relays may be selected by the LMF 306 based on a coarse position estimate of UE 302. Alternatively, at 1206, the LMF 306 may optionally transmit the coarse position estimate of UE 302 to the gNB 304, which in turn selects the set of UL relays for the position estimation procedure. In either case, at 1208, the gNB 304 transmits an SRS configuration for the UE 302 to transmit the UL SRS. In an aspect, the SRS configuration may be associated with a reduced transmission power level, a directional configuration (e.g., a beam configuration) based on the UL relay location(s), and so on. At 1210, the gNB 304 shares the UL SRS configuration with the LMF 306. At 1212, the LMF 306 transmits, to the selected set of UL relay(s), a request for the selected set of UL relay(s) to measure the UL SRS. At 1216, UE 302 transmits the UL SRS, which is measured by the selected set of UL relay(s) at 1218. At 1220, the selected set of UL relay(s) transmits the UL SRS measurements to the LMF 306. At 1224, the LMF 306 derives a position estimate of UE 302 based at least in part on the UL SRS measurements from the selected set of UL relay(s).

Referring to FIGS. 9-10, in some designs, various technical advantages may include:

Using UL relay(s) which are nearby to a target UE may increase accuracy and capacity, and/or Target UE can transmit UL SRS at lower power to be received and measured only by nearby UL relays in a small location area "A" around the target UE, and/or The lower transmission power reduces interference outside the area A, allowing other UEs outside area A to transmit UL SRS and to be positioned at the same time (by other UL relays), thereby increasing capacity, and/or The proximity of the UL relays in area A will increase position estimation accuracy of the target UE, and/or Position estimation procedures may be performed flexibly via various techniques, such as UL-TDOA, UL-AOA, and/or RTT-based position estimation procedures.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of operating a network component, comprising: determining a coarse position estimate associated with a target user equipment (UE); determining location information associated with a set of uplink relays; and selecting a group of wireless nodes for a position estimation session of the target UE based on the coarse position estimate and the location information associated with the set of uplink relays, the group of wireless nodes comprising at least one uplink relay that is configured to relay uplink wireless data communications from UEs to one or more serving network components configured to transmit downlink wireless data communications to the one or more UEs; transmitting, to the at least one uplink relay, at least one request to measure an uplink sounding reference signal (SRS) for positioning from the target UE in association with the position estimation session; receiving at least one report comprising measurement information associated with the uplink SRS for positioning from the target UE as measured by the at least one uplink relay; and determining a position estimate of the target UE based on the at least one report.

Clause 2. The method of clause 1, wherein the network component corresponds to a location management function (LMF).

Clause 3. The method of clause 2, wherein presence information associated with the set of uplink relays, the location information associated with the set of uplink relays, or both, is received at the LMF from a serving network component of the target UE.

Clause 4. The method of clause 3, wherein the presence information associated with the set of uplink relays, the location information associated with the set of uplink relays, or both, is received at the LMF from the serving network component of the target UE via NR Positioning Protocol A (NRPPa) signaling or Long Term Evolution Positioning Protocol A (LPPa) signaling.

Clause 5. The method of any of clauses 2 to 4, further comprising: transmitting, to a serving network component of the target UE, a request to enable an SRS measurement mode of the at least one uplink relay.

Clause 6. The method of clause 5, wherein the request to enable the SRS measurement mode of the at least one uplink relay is transmitted via NR Positioning Protocol A (NRPPa) signaling or Long Term Evolution Positioning Protocol A (LPPa) signaling.

Clause 7. The method of any of clauses 2 to 6, wherein the at least one report comprises combined information associated with measurement information from multiple uplink relays.

Clause 8. The method of any of clauses 2 to 7, wherein the at least one report is received from the at least one uplink relay or from a serving network component of the target UE.

Clause 9. The method of any of clauses 1 to 8, wherein the network component corresponds to a serving network component of the target UE.

Clause 10. The method of clause 9, wherein the coarse position estimate is received at the serving network component from a location management function (LMF).

Clause 11. The method of any of clauses 1 to 10, wherein the selection is based in part upon a number of network components that are associated with each of the set of uplink relays.

Clause 12. The method of clause 11, wherein the selection is weighted to favor selection of uplink relays that are associated with a higher number of network components.

Clause 13. The method of any of clauses 1 to 12, further comprising: determining a transmission power level for the uplink SRS for positioning based on location information associated with the group of wireless nodes.

Clause 14. The method of any of clauses 1 to 13, wherein the at least one uplink relay includes a single uplink relay.

Clause 15. The method of any of clauses 1 to 14, wherein the at least one uplink relay includes multiple uplink relays.

Clause 16. The method of any of clauses 1 to 15, further comprising: transmitting, to the target UE, a beam configuration associated with transmission of the uplink SRS for positioning.

Clause 17. A method of operating an uplink relay, comprising: receiving one or more uplink wireless data communications from one or more user equipments (UEs); relaying, via a backhaul connection, the one or more uplink data communications to one or more serving network components configured to transmit downlink wireless data communications to the one or more UEs; receiving, from a network component, a request to measure an uplink sounding reference signal (SRS) for positioning from a target UE; measuring the uplink SRS for positioning from the target UE in accordance with the request; and transmitting, to the network component, a report comprising measurement information associated with the measured uplink SRS for positioning.

Clause 18. The method of clause 17, wherein the network component corresponds to a location management function (LMF) or a serving network component of the target UE.

Clause 19. The method of any of clauses 17 to 18, wherein the uplink relay is closer to the target UE than a serving network component of the target UE.

Clause 20. The method of any of clauses 17 to 19, wherein the backhaul connection comprises a wireless backhaul connection.

Clause 21. The method of any of clauses 17 to 20, wherein the backhaul connection comprises a wired backhaul connection.

Clause 22. A network component, comprising: a memory; at least one transceiver; and at least one processor communicatively coupled to the memory and the at least one transceiver, the at least one processor configured to: determine a coarse position estimate associated with a target user equipment (UE); determine location information associated with a set of uplink relays; and select a group of wireless nodes for a position estimation session of the target UE based on the coarse position estimate and the location information associated with the set of uplink relays, the group of wireless nodes comprising at least one uplink relay that is configured to relay uplink wireless data communications from UEs to one or more serving network components configured to transmit downlink wireless data communications to the one or more UEs; transmit, via the at least one transceiver, to the at least one uplink relay, at least one request to measure an uplink sounding reference signal (SRS) for positioning from the target UE in association with the position estimation session; receive, via the at least one transceiver, at least one report comprising measurement information associated with the uplink SRS for positioning from the target UE as measured by the at least one uplink relay; and determine a position estimate of the target UE based on the at least one report.

Clause 23. The network component of clause 22, wherein the network component corresponds to a location management function (LMF).

Clause 24. The network component of clause 23, wherein presence information associated with the set of uplink relays, the location information associated with the set of uplink relays, or both, is received at the LMF from a serving network component of the target UE.

Clause 25. The network component of clause 24, wherein the presence information associated with the set of uplink relays, the location information associated with the set of uplink relays, or both, is received at the LMF from the serving network component of the target UE via NR Positioning Protocol A (NRPPa) signaling or Long Term Evolution Positioning Protocol A (LPPa) signaling.

Clause 26. The network component of any of clauses 23 to 25, wherein the at least one processor is further configured to: transmit, via the at least one transceiver, to a serving network component of the target UE, a request to enable an SRS measurement mode of the at least one uplink relay.

Clause 27. The network component of clause 26, wherein the request to enable the SRS measurement mode of the at least one uplink relay is transmitted via NR Positioning Protocol A (NRPPa) signaling or Long Term Evolution Positioning Protocol A (LPPa) signaling.

Clause 28. The network component of any of clauses 23 to 27, wherein the at least one report comprises combined information associated with measurement information from multiple uplink relays.

Clause 29. The network component of any of clauses 23 to 28, wherein the at least one report is received from the at least one uplink relay or from a serving network component of the target UE.

Clause 30. The network component of any of clauses 22 to 29, wherein the network component corresponds to a serving network component of the target UE.

Clause 31. The network component of clause 30, wherein the coarse position estimate is received at the serving network component from a location management function (LMF).

Clause 32. The network component of any of clauses 22 to 31, wherein the selection is based in part upon a number of network components that are associated with each of the set of uplink relays.

Clause 33. The network component of clause 32, wherein the selection is weighted to favor selection of uplink relays that are associated with a higher number of network components.

Clause 34. The network component of any of clauses 22 to 33, wherein the at least one processor is further configured to: determine a transmission power level for the uplink SRS for positioning based on location information associated with the group of wireless nodes.

Clause 35. The network component of any of clauses 22 to 34, wherein the at least one uplink relay includes a single uplink relay.

Clause 36. The network component of any of clauses 22 to 35, wherein the at least one uplink relay includes multiple uplink relays.

Clause 37. The network component of any of clauses 22 to 36, wherein the at least one processor is further configured to: transmit, via the at least one transceiver, to the target UE, a beam configuration associated with transmission of the uplink SRS for positioning.

Clause 38. An uplink relay, comprising: a memory; at least one transceiver; and at least one processor communicatively coupled to the memory and the at least one transceiver, the at least one processor configured to: receive, via the at least one transceiver, one or more uplink wireless data communications from one or more user equipments (UEs); relay, via a backhaul connection, the one or more uplink data communications to one or more serving network components configured to transmit downlink wireless data communications to the one or more UEs; receive, via the at least one transceiver, from a network component, a request to measure an uplink sounding reference signal (SRS) for positioning from a target UE; measure the uplink SRS for positioning from the target UE in accordance with the request; and transmit, via the at least one transceiver, to the network component, a report comprising measurement information associated with the measured uplink SRS for positioning.

Clause 39. The uplink relay of clause 38, wherein the network component corresponds to a location management function (LMF) or a serving network component of the target UE.

Clause 40. The uplink relay of any of clauses 38 to 39, wherein the uplink relay is closer to the target UE than a serving network component of the target UE.

Clause 41. The uplink relay of any of clauses 38 to 40, wherein the backhaul connection comprises a wireless backhaul connection.

Clause 42. The uplink relay of any of clauses 38 to 41, wherein the backhaul connection comprises a wired backhaul connection.

Clause 43. An uplink relay, comprising: means for determining a coarse position estimate associated with a target user equipment (UE); means for determining location information associated with a set of uplink relays; and means for selecting a group of wireless nodes for a position estimation session of the target UE based on the coarse position estimate and the location information associated with the set of uplink relays, the group of wireless nodes comprising at least one uplink relay that is configured to relay uplink wireless data communications from UEs to one or more serving network components configured to transmit downlink wireless data communications to the one or more UEs; means for transmitting, to the at least one uplink relay, at least one request to measure an uplink sounding reference signal (SRS) for positioning from the target UE in association with the position estimation session; means for receiving at least one report comprising measurement information associated with the uplink SRS for positioning from the target UE as measured by the at least one uplink relay; and means for determining a position estimate of the target UE based on the at least one report.

Clause 44. The uplink relay of clause 43, wherein the network component corresponds to a location management function (LMF).

Clause 45. The uplink relay of clause 44, wherein presence information associated with the set of uplink relays, the location information associated with the set of uplink relays, or both, is received at the LMF from a serving network component of the target UE.

Clause 46. The uplink relay of clause 45, wherein the presence information associated with the set of uplink relays, the location information associated with the set of uplink relays, or both, is received at the LMF from the serving network component of the target UE via NR Positioning Protocol A (NRPPa) signaling or Long Term Evolution Positioning Protocol A (LPPa) signaling.

Clause 47. The uplink relay of any of clauses 44 to 46, further comprising: means for transmitting, to a serving network component of the target UE, a request to enable an SRS measurement mode of the at least one uplink relay.

Clause 48. The uplink relay of clause 47, wherein the request to enable the SRS measurement mode of the at least one uplink relay is transmitted via NR Positioning Protocol A (NRPPa) signaling or Long Term Evolution Positioning Protocol A (LPPa) signaling.

Clause 49. The uplink relay of any of clauses 44 to 48, wherein the at least one report comprises combined information associated with measurement information from multiple uplink relays.

Clause 50. The uplink relay of any of clauses 44 to 49, wherein the at least one report is received from the at least one uplink relay or from a serving network component of the target UE.

Clause 51. The uplink relay of any of clauses 43 to 50, wherein the network component corresponds to a serving network component of the target UE.

Clause 52. The uplink relay of clause 51, wherein the coarse position estimate is received at the serving network component from a location management function (LMF).

Clause 53. The uplink relay of any of clauses 43 to 52, wherein the selection is based in part upon a number of network components that are associated with each of the set of uplink relays.

Clause 54. The uplink relay of clause 53, wherein the selection is weighted to favor selection of uplink relays that are associated with a higher number of network components.

Clause 55. The uplink relay of any of clauses 43 to 54, further comprising: means for determining a transmission power level for the uplink SRS for positioning based on location information associated with the group of wireless nodes.

Clause 56. The uplink relay of any of clauses 43 to 55, wherein the at least one uplink relay includes a single uplink relay.

Clause 57. The uplink relay of any of clauses 43 to 56, wherein the at least one uplink relay includes multiple uplink relays.

Clause 58. The uplink relay of any of clauses 43 to 57, further comprising: means for transmitting, to the target UE, a beam configuration associated with transmission of the uplink SRS for positioning.

Clause 59. A network component, comprising: means for receiving one or more uplink wireless data communications from one or more user equipments (UEs); means for relaying, via a backhaul connection, the one or more uplink data communications to one or more serving network components configured to transmit downlink wireless data communications to the one or more UEs; means for receiving, from a network component, a request to measure an uplink sounding reference signal (SRS) for positioning from a target UE; means for measuring the uplink SRS for positioning from the target UE in accordance with the request; and means for transmitting, to the network component, a report comprising measurement information associated with the measured uplink SRS for positioning.

Clause 60. The network component of clause 59, wherein the network component corresponds to a location management function (LMF) or a serving network component of the target UE.

Clause 61. The network component of any of clauses 59 to 60, wherein the uplink relay is closer to the target UE than a serving network component of the target UE.

Clause 62. The network component of any of clauses 59 to 61, wherein the backhaul connection comprises a wireless backhaul connection.

Clause 63. The network component of any of clauses 59 to 62, wherein the backhaul connection comprises a wired backhaul connection.

Clause 64. A non-transitory computer-readable medium storing computer-executable instructions that, when executed by a network component, cause the network component to: determine a coarse position estimate associated with a target user equipment (UE); determine location information associated with a set of uplink relays; and select a group of wireless nodes for a position estimation session of the target UE based on the coarse position estimate and the location information associated with the set of uplink relays, the group of wireless nodes comprising at least one uplink relay that is configured to relay uplink wireless data communications from UEs to one or more serving network components configured to transmit downlink wireless data communications to the one or more UEs; transmit, to the at least one uplink relay, at least one request to measure an uplink sounding reference signal (SRS) for positioning from the target UE in association with the position estimation session; receive at least one report comprising measurement information associated with the uplink SRS for positioning from the target UE as measured by the at least one uplink relay; and determine a position estimate of the target UE based on the at least one report.

Clause 65. The non-transitory computer-readable medium of clause 64, wherein the network component corresponds to a location management function (LMF).

Clause 66. The non-transitory computer-readable medium of clause 65, wherein presence information associated with the set of uplink relays, the location information associated with the set of uplink relays, or both, is received at the LMF from a serving network component of the target UE.

Clause 67. The non-transitory computer-readable medium of clause 66, wherein the presence information associated with the set of uplink relays, the location information associated with the set of uplink relays, or both, is received at the LMF from the serving network component of the target UE via NR Positioning Protocol A (NRPPa) signaling or Long Term Evolution Positioning Protocol A (LPPa) signaling.

Clause 68. The non-transitory computer-readable medium of any of clauses 65 to 67, further comprising computer-executable instructions that, when executed by the network component, cause the network component to: transmit, to a serving network component of the target UE, a request to enable an SRS measurement mode of the at least one uplink relay.

Clause 69. The non-transitory computer-readable medium of clause 68, wherein the request to enable the SRS measurement mode of the at least one uplink relay is transmitted via NR Positioning Protocol A (NRPPa) signaling or Long Term Evolution Positioning Protocol A (LPPa) signaling.

Clause 70. The non-transitory computer-readable medium of any of clauses 65 to 69, wherein the at least one report comprises combined information associated with measurement information from multiple uplink relays.

Clause 71. The non-transitory computer-readable medium of any of clauses 65 to 70, wherein the at least one report is received from the at least one uplink relay or from a serving network component of the target UE.

Clause 72. The non-transitory computer-readable medium of any of clauses 64 to 71, wherein the network component corresponds to a serving network component of the target UE.

Clause 73. The non-transitory computer-readable medium of clause 72, wherein the coarse position estimate is received at the serving network component from a location management function (LMF).

Clause 74. The non-transitory computer-readable medium of any of clauses 64 to 73, wherein the selection is based in part upon a number of network components that are associated with each of the set of uplink relays.

Clause 75. The non-transitory computer-readable medium of clause 74, wherein the selection is weighted to favor selection of uplink relays that are associated with a higher number of network components.

Clause 76. The non-transitory computer-readable medium of any of clauses 64 to 75, further comprising computer-executable instructions that, when executed by the network component, cause the network component to: determine a transmission power level for the uplink SRS for positioning based on location information associated with the group of wireless nodes.

Clause 77. The non-transitory computer-readable medium of any of clauses 64 to 76, wherein the at least one uplink relay includes a single uplink relay.

Clause 78. The non-transitory computer-readable medium of any of clauses 64 to 77, wherein the at least one uplink relay includes multiple uplink relays.

Clause 79. The non-transitory computer-readable medium of any of clauses 64 to 78, further comprising computer-executable instructions that, when executed by the network component, cause the network component to: transmit, to the target UE, a beam configuration associated with transmission of the uplink SRS for positioning.

Clause 80. A non-transitory computer-readable medium storing computer-executable instructions that, when executed by an uplink relay, cause the uplink relay to: receive one or more uplink wireless data communications from one or more user equipments (UEs); relay, via a backhaul connection, the one or more uplink data communications to one or more serving network components configured to transmit downlink wireless data communications to the one or more UEs; receive, from a network component, a request to measure an uplink sounding reference signal (SRS) for positioning from a target UE; measure the uplink SRS for positioning from the target UE in accordance with the request; and transmit, to the network component, a report comprising measurement information associated with the measured uplink SRS for positioning.

Clause 81. The non-transitory computer-readable medium of clause 80, wherein the network component corresponds to a location management function (LMF) or a serving network component of the target UE.

Clause 82. The non-transitory computer-readable medium of any of clauses 80 to 81, wherein the uplink relay is closer to the target UE than a serving network component of the target UE.

Clause 83. The non-transitory computer-readable medium of any of clauses 80 to 82, wherein the backhaul connection comprises a wireless backhaul connection.

Clause 84. The non-transitory computer-readable medium of any of clauses 80 to 83, wherein the backhaul connection comprises a wired backhaul connection.

Clause 85. An apparatus comprising a memory, a transceiver, and a processor communicatively coupled to the memory and the transceiver, the memory, the transceiver, and the processor configured to perform a method according to any of clauses 1 to 84.

Clause 86. An apparatus comprising means for performing a method according to any of clauses 1 to 84.

Clause 87. A non-transitory computer-readable medium storing computer-executable instructions, the computer-executable comprising at least one instruction for causing a computer or processor to perform a method according to any of clauses 1 to 84.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a network component, comprising:
   determining a coarse position estimate associated with a target user equipment (UE);
   determining location information associated with a set of uplink relays; and
   selecting a group of wireless nodes for a position estimation session of the target UE based on the coarse position estimate and the location information associated with the set of uplink relays, the group of wireless nodes comprising at least one uplink relay that is configured to relay uplink wireless data communications from UEs to one or more serving network components configured to transmit downlink wireless data communications to the one or more UEs;
   transmitting, to the at least one uplink relay, at least one request to measure an uplink sounding reference signal (SRS) for positioning from the target UE in association with the position estimation session;
   receiving at least one report comprising measurement information associated with the uplink SRS for positioning from the target UE as measured by the at least one uplink relay; and
   determining a position estimate of the target UE based on the at least one report,
   wherein the selection is weighted to favor selection of uplink relays that are associated with a higher number of network components,
   wherein a transmission power level for the uplink SRS for positioning is based on location information associated with the group of wireless nodes
   wherein the at least one uplink relay is closer to the target UE than a serving network component of the target UE.

2. The method of claim 1, wherein the network component corresponds to a location management function (LMF).

3. The method of claim 2, wherein presence information associated with the set of uplink relays, the location information associated with the set of uplink relays, or both, is received at the LMF from the serving network component of the target UE.

4. The method of claim 3, wherein the presence information associated with the set of uplink relays, the location information associated with the set of uplink relays, or both, is received at the LMF from the serving network component of the target UE via NR Positioning Protocol A (NRPPa) signaling or Long Term Evolution Positioning Protocol A (LPPa) signaling.

5. The method of claim 2, further comprising:
   transmitting, to the serving network component of the target UE, a request to enable an SRS measurement mode of the at least one uplink relay.

6. The method of claim 5, wherein the request to enable the SRS measurement mode of the at least one uplink relay is transmitted via NR Positioning Protocol A (NRPPa) signaling or Long Term Evolution Positioning Protocol A (LPPa) signaling.

7. The method of claim 2, wherein the at least one report comprises combined information associated with measurement information from multiple uplink relays.

8. The method of claim 2, wherein the at least one report is received from the at least one uplink relay or from the serving network component of the target UE.

9. The method of claim 1, wherein the network component corresponds to the serving network component of the target UE.

10. The method of claim 9, wherein the coarse position estimate is received at the serving network component from a location management function (LMF).

11. The method of claim 1, wherein the at least one uplink relay includes a single uplink relay.

12. The method of claim 1, wherein the at least one uplink relay includes multiple uplink relays.

13. The method of claim 1, further comprising:
   transmitting, to the target UE, a beam configuration associated with transmission of the uplink SRS for positioning.

14. A method of operating an uplink relay, comprising:
   receiving one or more uplink wireless data communications from one or more user equipments (UEs);
   relaying, via a backhaul connection, the one or more uplink data communications to one or more serving network components configured to transmit downlink wireless data communications to the one or more UEs;
   receiving, from a network component, a request to measure an uplink sounding reference signal (SRS) for positioning from a target UE;

measuring the uplink SRS for positioning from the target UE in accordance with the request; and transmitting, to the network component, a report comprising measurement information associated with the measured uplink SRS for positioning, wherein the uplink relay is associated with a higher number of network components than one or more other uplink relays in range of the uplink SRS, wherein a transmission power level for the uplink SRS for positioning is based on location information associated with the group of wireless nodes, and wherein the uplink relay is closer to the target UE than a serving network component of the target UE.

15. The method of claim 14, wherein the network component corresponds to a location management function (LMF) or the serving network component of the target UE.

16. The method of claim 14, wherein the backhaul connection comprises a wireless backhaul connection.

17. The method of claim 14, wherein the backhaul connection comprises a wired backhaul connection.

18. A network component, comprising:
a memory;
at least one transceiver; and
at least one processor communicatively coupled to the memory and the at least one transceiver, the at least one processor configured to:
determine a coarse position estimate associated with a target user equipment (UE);
determine location information associated with a set of uplink relays; and
select a group of wireless nodes for a position estimation session of the target UE based on the coarse position estimate and the location information associated with the set of uplink relays, the group of wireless nodes comprising at least one uplink relay that is configured to relay uplink wireless data communications from UEs to one or more serving network components configured to transmit downlink wireless data communications to the one or more UEs;
transmit, via the at least one transceiver, to the at least one uplink relay, at least one request to measure an uplink sounding reference signal (SRS) for positioning from the target UE in association with the position estimation session;
receive, via the at least one transceiver, at least one report comprising measurement information associated with the uplink SRS for positioning from the target UE as measured by the at least one uplink relay; and
determine a position estimate of the target UE based on the at least one report,
wherein the selection is weighted to favor selection of uplink relays that are associated with a higher number of network components,
wherein a transmission power level for the uplink SRS for positioning is based on location information associated with the group of wireless nodes wherein the at least one uplink relay is closer to the target UE than a serving network component of the target UE.

19. The network component of claim 18, wherein the network component corresponds to a location management function (LMF).

20. The network component of claim 19, wherein presence information associated with the set of uplink relays, the location information associated with the set of uplink relays, or both, is received at the LMF from the serving network component of the target UE.

21. The network component of claim 19, wherein the at least one report comprises combined information associated with measurement information from multiple uplink relays.

22. The network component of claim 19, wherein the at least one report is received from the at least one uplink relay or from the serving network component of the target UE.

23. The network component of claim 18, wherein the network component corresponds to the serving network component of the target UE.

24. An uplink relay, comprising:
a memory;
at least one transceiver; and
at least one processor communicatively coupled to the memory and the at least one transceiver, the at least one processor configured to:
receive, via the at least one transceiver, one or more uplink wireless data communications from one or more user equipments (UEs);
relay, via a backhaul connection, the one or more uplink data communications to one or more serving network components configured to transmit downlink wireless data communications to the one or more UEs;
receive, via the at least one transceiver, from a network component, a request to measure an uplink sounding reference signal (SRS) for positioning from a target UE;
measure the uplink SRS for positioning from the target UE in accordance with the request; and
transmit, via the at least one transceiver, to the network component, a report comprising measurement information associated with the measured uplink SRS for positioning,
wherein the uplink relay is associated with a higher number of network components than one or more other uplink relays in range of the uplink SRS,
wherein a transmission power level for the uplink SRS for positioning is based on location information associated with the group of wireless nodes
wherein the uplink relay is closer to the target UE than a serving network component of the target UE.

25. The uplink relay of claim 24, wherein the network component corresponds to a location management function (LMF) or the serving network component of the target UE.

* * * * *